(12) United States Patent
Tsukamoto et al.

(10) Patent No.: US 9,935,527 B2
(45) Date of Patent: Apr. 3, 2018

(54) TEMPERATURE ESTIMATION APPARATUS FOR ROTATING ELECTRIC MACHINE

(71) Applicant: HONDA MOTOR CO., LTD., Tokyo (JP)

(72) Inventors: Yoshito Tsukamoto, Wako (JP); Yuta Ito, Wako (JP); Munehiro Matsubara, Wako (JP); Hiroyuki Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 15/156,245

(22) Filed: May 16, 2016

(65) Prior Publication Data
US 2016/0344268 A1 Nov. 24, 2016

(30) Foreign Application Priority Data

May 19, 2015 (JP) .................................. 2015-101670

(51) Int. Cl.
*H02K 11/00* (2016.01)
*H02K 11/25* (2016.01)
(Continued)

(52) U.S. Cl.
CPC ............... *H02K 11/25* (2016.01); *H02K 9/19* (2013.01); *H02P 29/60* (2016.02); *G01K 2205/00* (2013.01); *H02K 2209/00* (2013.01)

(58) Field of Classification Search
CPC ...... H02K 11/25; H02K 9/19; H02K 2209/00; H02K 9/005; H02P 29/60; H02P 31/00; H02P 23/14; G01K 17/06; G01K 13/02; G01K 7/42; G01K 7/427; G01K 2013/026; G01K 2205/00
(Continued)

(56) References Cited

U.S. PATENT DOCUMENTS 8,482,237 B2 * 7/2013 Berry .................... B60L 3/0061
236/67
8,487,575 B2 * 7/2013 Yeh ........................ H02P 29/664
318/432
(Continued)

FOREIGN PATENT DOCUMENTS

EP 2154502 * 2/2010 ............... G01K 7/24
JP 4572907 B2 10/2008

*Primary Examiner* — Burton Mullins
(74) *Attorney, Agent, or Firm* — Mori & Ward, LLP

(57) ABSTRACT

A temperature estimation apparatus for a rotating electric machine includes a coolant dissipator, a heat dissipation amount calculator, a coolant temperature calculator, and a temperature calculator. The coolant dissipator is to cool down a coolant by heat exchange with a cooling air outside a rotating electric machine. The heat dissipation amount calculator is to calculate heat dissipation amount of the coolant in the coolant dissipator based on a physical quantity correlating with air speed of the cooling air and a physical quantity correlating with flow rate of the coolant. The coolant temperature calculator is to calculate, based on the heat dissipation amount, temperature of the coolant that has passed through the coolant dissipator. The temperature calculator is to calculate, based on the temperature of the coolant, temperature of the rotating electric machine which the coolant cool down.

15 Claims, 12 Drawing Sheets

(51) Int. Cl.
*H02K 9/19* (2006.01)
*H02P 29/60* (2016.01)

(58) Field of Classification Search
USPC .............................................. 310/53; 702/130
See application file for complete search history.

(56) References Cited

U.S. PATENT DOCUMENTS

| | | | |
|---|---|---|---|
| 9,091,600 B2* | 7/2015 | Senoo | G01K 7/42 |
| 9,768,668 B2* | 9/2017 | Imanishi | H02K 9/19 |
| 2004/0069546 A1* | 4/2004 | Lou | B60K 6/22 |
| | | | 180/65.21 |
| 2015/0248123 A1* | 9/2015 | Tezuka | G05B 19/18 |
| | | | 700/275 |
| 2017/0131158 A1* | 5/2017 | Matsubara | G01K 17/06 |
| 2017/0133972 A1* | 5/2017 | Ito | H02P 29/64 |

\* cited by examiner

TEMPERATURE ESTIMATION APPARATUS FOR ROTATING ELECTRIC MACHINE

CROSS-REFERENCE TO RELATED APPLICATIONS

The present application claims priority under 35 U.S.C. § 119 to Japanese Patent Application No. 2015-101670, filed May 19, 2015, entitled "Temperature Estimation Device for Rotating Electric Machine." The contents of this application are incorporated herein by reference in their entirety.

BACKGROUND

1. Field

The present disclosure relates to a temperature estimation apparatus for a rotating electric machine.

2. Description of the Related Art

Conventionally, there is known a motor control apparatus that calculates magnet temperature with a stator coil temperature in a running motor and a liquid temperature of a cooling liquid as inputs by using a thermal model among the cooling liquid, the stator coil and a rotor magnet (for example, see Japanese Patent No. 4572907). In the motor control apparatus, a temperature sensor for detecting liquid temperature of the cooling liquid is provided outside the motor to detect the liquid temperature of the cooling liquid flowing out from the inside of the motor.

SUMMARY

According to one aspect of the present invention, a temperature estimation apparatus for a rotating electric machine includes a coolant dissipator, a heat dissipation amount acquisition unit, a coolant temperature acquisition unit, and a temperature estimation unit. The coolant dissipator is configured to cool down a coolant by heat exchange with a cooling air outside a rotating electric machine. The coolant cools down the rotating electric machine. The heat dissipation amount acquisition unit is configured to acquire heat dissipation amount of the coolant in the coolant dissipator based on a physical quantity correlating with air speed of the cooling air and a physical quantity correlating with flow rate of the coolant. The coolant temperature acquisition unit is configured to acquire temperature of the coolant that has passed through the coolant dissipator, based on the heat dissipation amount of the coolant acquired by the heat dissipation amount acquisition unit. The temperature estimation unit is configured to estimate temperature of a predetermined part of the rotating electric machine, which exchanges heat with the coolant, by using the temperature of the coolant acquired by the coolant temperature acquisition unit.

According to another aspect of the present invention, a temperature estimation apparatus for a rotating electric machine includes a coolant dissipator, a heat dissipation amount calculator, a coolant temperature calculator, and a temperature calculator. The coolant dissipator is to cool down a coolant by heat exchange with a cooling air outside a rotating electric machine. The heat dissipation amount calculator is to calculate heat dissipation amount of the coolant in the coolant dissipator based on a physical quantity correlating with air speed of the cooling air and a physical quantity correlating with flow rate of the coolant. The coolant temperature calculator is to calculate, based on the heat dissipation amount, temperature of the coolant that has passed through the coolant dissipator. The temperature calculator is to calculate, based on the temperature of the coolant, temperature of the rotating electric machine which the coolant cool down.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
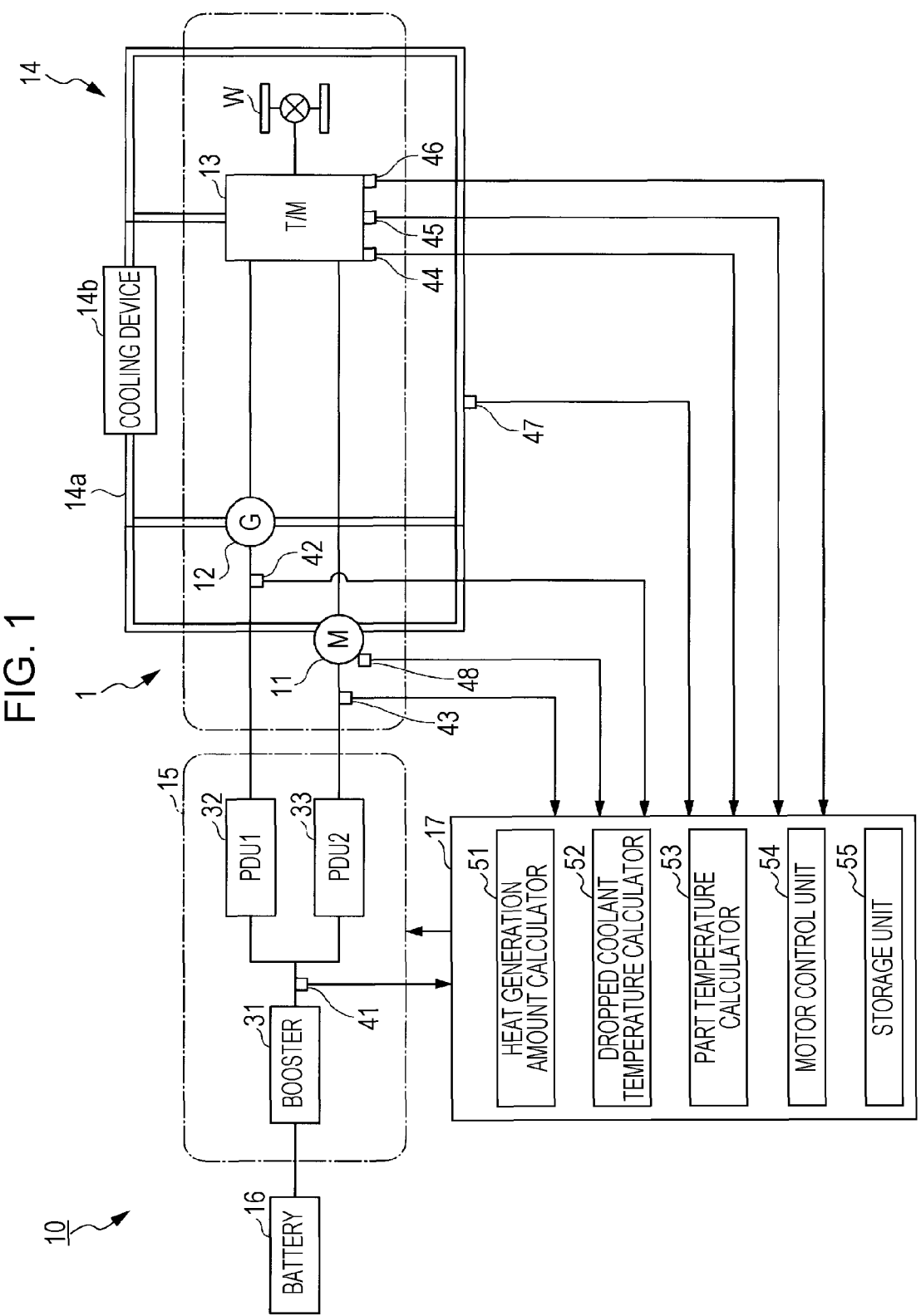
FIG. 1 is a configuration diagram of a temperature estimation device for a rotating electric machine according to an embodiment of the present disclosure.

The embodiments will now be described with reference to the accompanying drawings, wherein like reference numerals designate corresponding or identical elements throughout the various drawings.

Hereinafter, a temperature estimation device for a rotating electric machine according to one embodiment of the present disclosure is described with reference to the accompanying drawings.

A temperature estimation device 10 of a rotating electric machine according to the present embodiment is mounted on a vehicle 1 such as, for example, a hybrid vehicle or an electric vehicle. As illustrated in FIG. 1, the vehicle 1 includes a driving motor (M) 11, a power generation motor (G) 12, a transmission (T/M) 13, a coolant circulation unit 14, a power conversion unit 15, a battery 16, and a controller 17.

Each of the driving motor 11 and the power generation motor 12 is, for example, a 3-phase AC brushless DC motor. Each of the driving motor 11 and the power generation motor 12 includes a rotating shaft coupled with the transmission 13. The rotating shaft of the power generation motor 12 is coupled to a mechanical pump 14c of the coolant circulation unit 14 described later.

Figure 2:
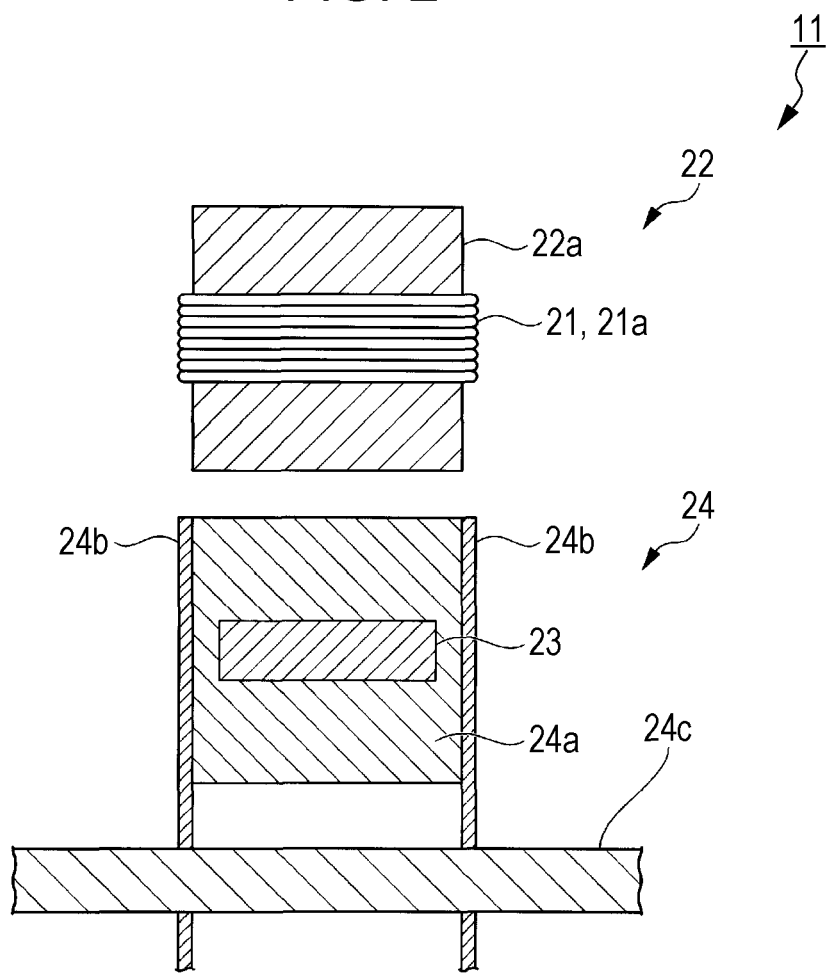
FIG. 2 is a cross section illustrating a partial configuration of a driving motor of the temperature estimation device for a rotating electric machine according to the embodiment of the present disclosure.

As illustrated in FIG. 2, the driving motor 11 includes a stator 22 with a coil 21 and a rotor 24 with a magnet 23. The driving motor 11 is an inner rotor motor including the rotor 24 inside the cylindrical stator 22. A rotating shaft (rotating shaft 24c described later) of the driving motor 11 is coupled with a drive shaft of the vehicle 1.

The coil 21 is, for example, such as a SC (segment conductor) wound coil. The coil 21 is mounted in a slot formed between adjacent teeth of a stator core 22a. The coil 21 is connected to a power conversion unit 15 described later.

The stator core 22a has a cylindrical outer shape. The stator core 22a includes a plurality of teeth on an inner peripheral section in the radial direction. Each of the plurality of teeth projects toward the inner peripheral side at predetermined intervals in a circumferential direction on the inner peripheral section of the stator core 22a. A plurality of slots extending through the stator core 22a in the rotation axis direction are provided on the inner peripheral section of the stator core 22a. Each slot is formed between adjacent teeth in the circumferential direction. Each slot is formed so as to radially extend from the inner circumferential side to the outer circumferential side of the stator core 22a in the radial direction.

The coil 21 is a 3-phase coil including U phase, V phase, and W phase. The coil 21 includes a plurality of segment coils. Each of the segment coils includes a plurality of wires having a rectangular cross section. The plurality of wires are, for example, rectangular wires. The plurality of wires are aligned in a single row such that surfaces thereof face each other to form a single bundle. Each segment coil has a U-shaped outer shape such that each slot is filled without gaps according to the shape thereof.

Both ends of each segment coil are inserted into two slots disposed at predetermined intervals in the circumferential direction from the axial direction of the stator core 22a. Ends of each segment coil project outward from the inside of each slot in the axial direction and are torsionally bent in the circumferential direction. Out of a plurality of ends projecting outward from the inside of a plurality of slots, ends of a predetermined combination are bonded with each other by TIG welding. Ends of the plurality of segment coils inserted into the plurality of slots are arranged in the order of U phase, U phase, V phase, V phase, W phase, W phase, U phase, U phase . . . in the circumferential direction.

The magnet 23 is, for example, a permanent magnet. The magnet 23 is retained inside a rotor yoke 24a so as not to be in direct contact with a pair of end face plates 24b that hold the rotor yoke 24a from both sides of the rotating shaft 24c in the axial direction.

The power generation motor 12 has, for example, the same configuration as the driving motor 11.

The transmission 13 is, for example, an AT (automatic transmission). As illustrated in FIG. 1, the transmission 13 is coupled with each of the driving motor 11 and the power generation motor 12, and a drive wheel W. The transmission 13 controls power transmission between each of the driving motor 11 and the power generation motor 12 and the drive wheel W in response to a control signal outputted from the controller 17 described later.

Figure 3:
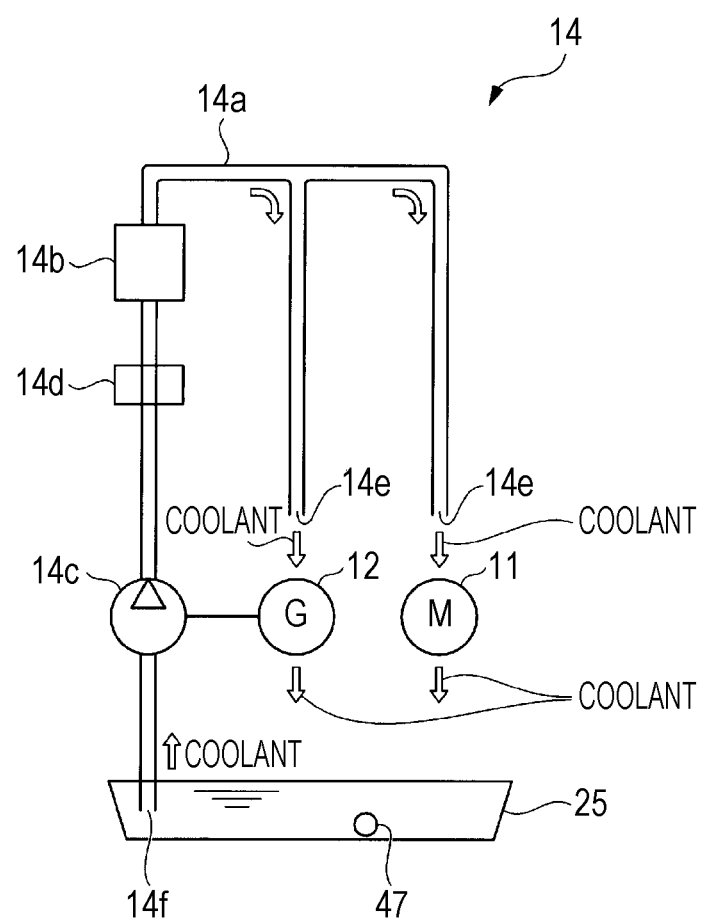
FIG. 3 is a schematic diagram of a coolant flow passage of the temperature estimation device for a rotating electric machine according to the embodiment of the present disclosure.

As illustrated in FIG. 3, the coolant circulation unit 14 includes a coolant flow passage 14a where a coolant circulates, a cooling device 14b configured to cool down the coolant, a mechanical pump 14c configured to circulate the coolant, and a control valve 14d. In the coolant circulation unit 14, for example, hydraulic oil for lubrication and power transmission in the transmission 13 of AT (automatic transmission) is used as a coolant.

The coolant flow passage 14a is connected to a hydraulic oil flow passage inside the transmission 13 and to the inside of each of the driving motor 11 and the power generation motor 12. The coolant flow passage 14a includes a discharge port 14e configured to discharge the coolant to each of the driving motor 11 and the power generation motor 12, and a suction port 14f configured to suction the coolant stored at the bottom section of a housing 25 through the inside of each of the driving motor 11 and the power generation motor 12. The discharge port 14e of the coolant flow passage 14a is disposed at a vertical upper part of each of the driving motor 11 and the power generation motor 12. The suction port 14f of the coolant flow passage 14a is disposed at the bottom of the housing 25 provided at a vertical lower part of each of the driving motor 11 and the power generation motor 12.

The cooling device 14b is provided in the coolant flow passage 14a outside the driving motor 11, the power generation motor 12, and the transmission 13. The cooling device 14b is, for example, a dissipator, and is configured to cool down the coolant in the coolant flow passage 14a by heat exchange with cooling air such as traveling wind during vehicle traveling.

The mechanical pump 14c is disposed in the vicinity of the suction port 14f in the coolant flow passage 14a. The mechanical pump 14c is, for example, a trochoid pump. The mechanical pump 14c is coupled with a rotating shaft of the power generation motor 12 and operates with a driving force of the power generation motor 12. The mechanical pump 14c generates a suction force by drive of the power generation motor 12, suctions the coolant through the suction port 14f of the coolant flow passage 14a, and causes the coolant in the coolant flow passage 14a to flow toward the discharge port 14e.

The control valve 14d is disposed between the cooling device 14b and the mechanical pump 14c in the coolant flow passage 14a. The control valve 14d is configured to control flow rate and pressure of the coolant in the coolant flow passage 14a in response to a control signal outputted from the controller 17 described later.

The coolant circulation unit 14 is configured to discharge the coolant through the discharge port 14e of the coolant flow passage 14a toward a coil end (a section projecting outward in the axial direction from a slot of the stator core 22a) of the coil 21 with respect to each of the driving motor 11 and the power generation motor 12, as the mechanical pump 14c operates. The coolant flows downward in the vertical direction on surfaces of the coil end of the coil 21 and the stator core 22a by the action of the gravity. The coolant flows downward in the vertical direction so as to be dropped from the coil end of the coil 21 or the stator core 22a to the end face plate 24b via a gap between the stator 22 and the rotor 24 by the action of the gravity. The coolant (dropped coolant) dropped from the stator 22 onto the surface of the end face plate 24b flows on the surface of the end face plate 24b toward the outside of the end face plate 24b by the centrifugal force generated by the rotation of the rotor 24 and by the action of the gravity. The dropped coolant flowing out through the end face plate 24b flows into a coolant storage unit at the bottom of the housing 25 by the action of the gravity.

Figure 4:
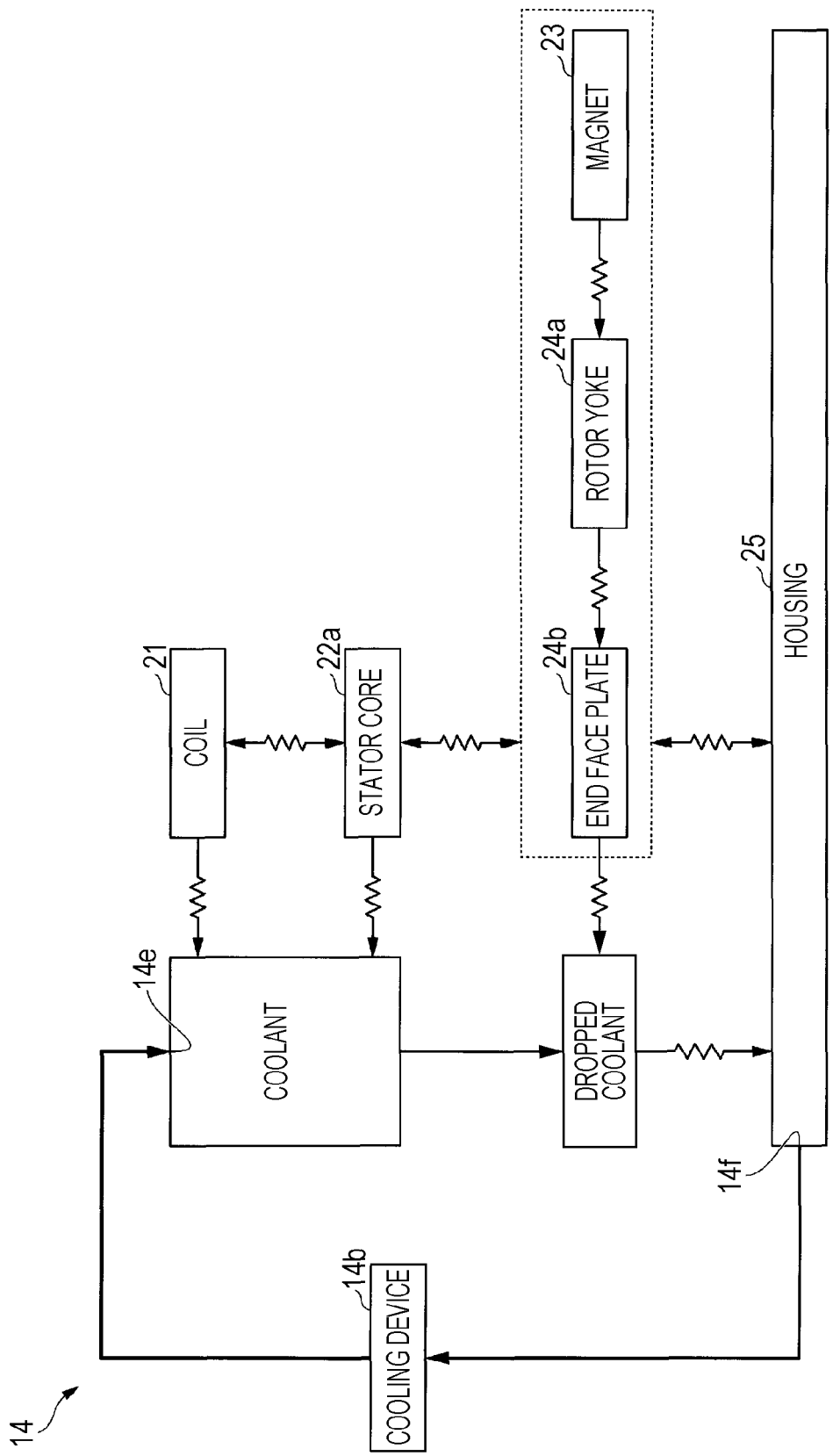
FIG. 4 is a schematic diagram of a thermal model of the temperature estimation device for a rotating electric machine according to the embodiment of the present disclosure.

The coolant circulation unit 14 suctions the coolant stored in the coolant storage unit from the suction port 14f into the coolant flow passage 14a by suction of the mechanical pump 14c and cools down by the cooling device 14b. Thus, the coolant circulation unit 14 cools down the stator 22 and the rotor 24 of each of the driving motor 11 and the power generation motor 12 with the coolant cooled down by heat exchange with cooling air in the cooling device 14b. As illustrated in FIG. 4, the coolant circulation unit 14 directly cools down the coil end of the coil 21 and the stator core 22a with the coolant discharged through the discharge port 14e. The coolant circulation unit 14 directly cools down the end face plate 24b with the coolant dropped from the stator 22 onto the end face plate 24b, and indirectly cools down the rotor yoke 24a and the magnet 23 sequentially via the end face plate 24b with the dropped coolant.

As illustrated in FIG. 1, the power conversion unit 15 includes a booster 31 configured to boost output voltage of the battery 16, a first power drive unit (PDU1) 32 configured to control energization of the power generation motor 12, and a second power drive unit (PDU2) 33 configured to control energization of the driving motor 11.

The booster 31 includes, for example, a DC-DC converter and so on. The booster 31 is coupled between the battery 16 and the first and second power drive units 32, 33. The booster 31 is configured to generate applied voltage for the first and second power drive units 32, 33 by boosting output voltage of the battery 16 in response to a control signal outputted from the controller 17 described later. The booster 31 is configured to output applied voltage generated by boosting output voltage of the battery 16 to the first and second power drive units 32, 33.

The first and second power drive units 32, 33 include, for example, an inverter device and so on. The first and second power drive units 32, 33 include, for example, a bridge circuit formed by bridging a plurality of switching elements (for example, such as MOSFETs) and a smoothing capacitor, as an inverter device. The first and second power drive units 32, 33 are configured to convert DC output power of the booster 31 to three phase AC power in response to a control signal outputted from the controller 17 described later. The first and second power drive units 32, 33 supply three phase AC current to each of three phase coils 21 so as to sequen-tially commutate energization to each of the power generation motor 12 and the driving motor 11.

The controller 17 includes various storage media such as a central processing unit (CPU) and a random access memory (RAM) and electronic circuits such as a timer. The controller 17 outputs a control signal for controlling the transmission 13 and the power conversion unit 15. The controller 17 outputs a control signal for controlling the control valve 14d of the coolant circulation unit 14. The controller 17 is connected to a voltage sensor 41, a first current sensor 42, a second current sensor 43, a first revolution number sensor 44, a second revolution number sensor 45, a torque sensor 46, a coolant temperature sensor 47, and a coil temperature sensor 48.

The voltage sensor 41 is configured to detect applied voltage applied from the booster 31 to each of first and second power drive units 32, 33. The first current sensor 42 is configured to detect AC current (phase current) flowing between each of the coils 21 of the first power drive unit 32 and the power generation motor 12. The second current sensor 43 is configured to detect AC current (phase current) flowing between each of the coils 21 of the second power drive unit 33 and the driving motor 11. The first revolution number sensor 44 is configured to detect the number of revolution of the driving motor 11 by sequentially detecting rotation angle of the rotation shaft of the driving motor 11. The second revolution number sensor 45 is configured to detect the number of revolution of the power generation motor 12 by sequentially detecting rotation angle of the rotation shaft of the power generation motor 12. The torque sensor 46 is configured to detect torque of the driving motor 11. As illustrated in FIG. 3, the coolant temperature sensor 47 is disposed in the coolant storage unit at the bottom of the housing 25. The coolant temperature sensor 47 is configured to detect temperature of the coolant that is stored in the coolant storage unit, after flowing out downward from each of the driving motor 11 and the power generation motor 12. The coil temperature sensor 48 is, for example, a thermistor and so on, and is configured to detect temperature of the coil 21 (coil temperature) of the driving motor 11.

As illustrated in FIG. 1, the controller 17 includes a heat generation amount calculator 51, a dropped coolant temperature calculator 52, a part temperature calculator (a temperature calculator) 53, a motor control unit 54, and a storage unit 55.

The heat generation amount calculator 51 is configured to calculate the heat generation amount generated by a loss in each of the driving motor 11 and the power generation motor 12. The heat generation amount calculator 51 calculates, for example, the heat generation amount generated by copper loss of the three phase coil 21, iron loss of the rotor yoke 24a, and eddy current loss of the magnet 23 in the driving motor 11.

The heat generation amount calculator 51 calculates copper loss of the three phase coil 21 according to a three-phase phase current of the driving motor 11 detected by the second current sensor 43 and a resistance value of the three phase coil 21 prestored in the storage unit 55.

Figure 5:
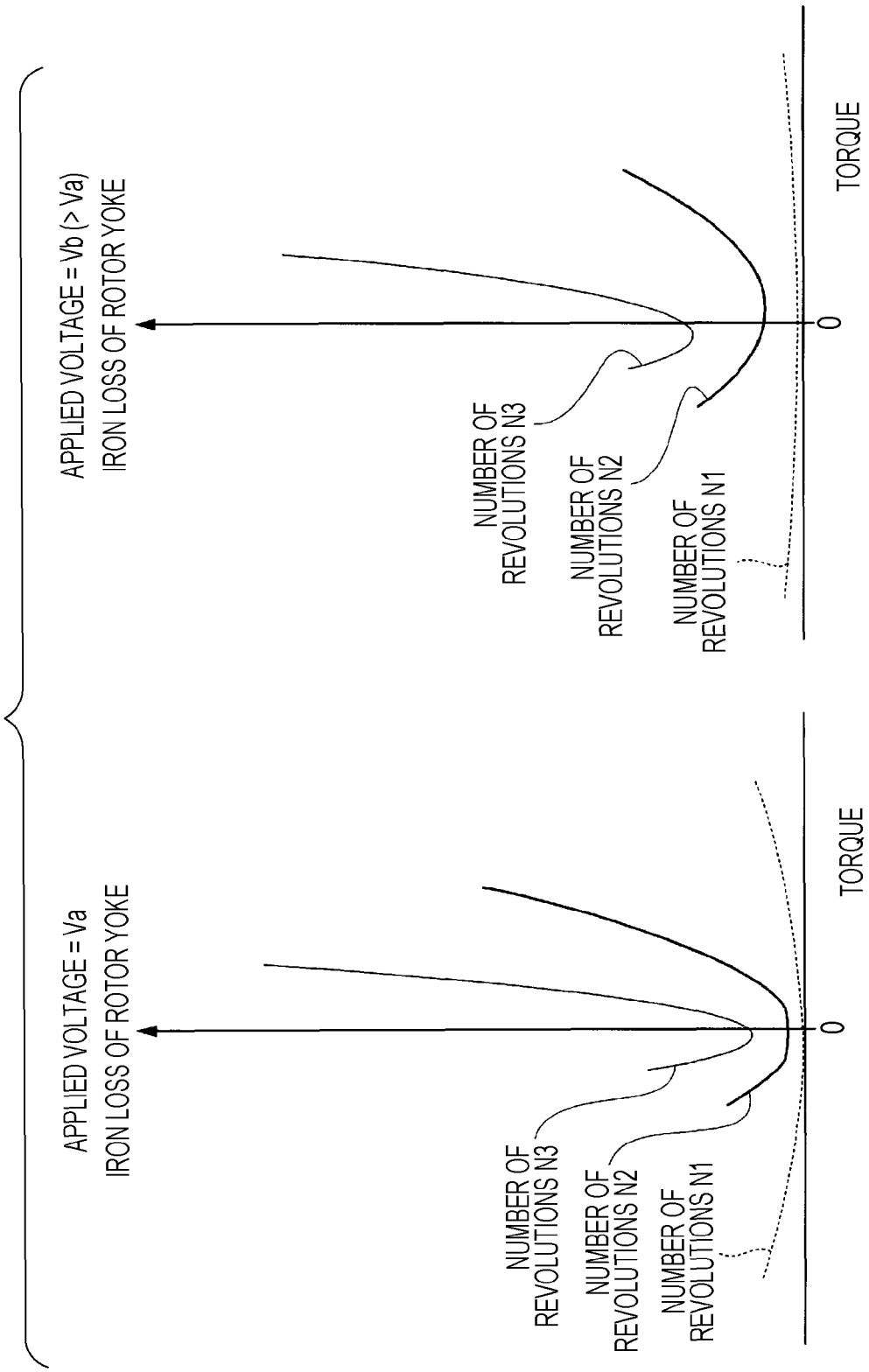
FIG. 5 is a diagram illustrating a correlation among applied voltage, revolution, torque, and iron loss of the rotor yoke in the driving motor of the temperature estimation device for a rotating electric machine according to the embodiment of the present disclosure.

The heat generation amount calculator 51 calculates iron loss $W_{YOKE}$ of the rotor yoke 24a according to applied voltage detected by the voltage sensor 41, the number of revolution of the driving motor 11 detected by the first revolution number sensor 44, and torque of the driving motor 11 detected by the torque sensor 46. As illustrated in FIG. 5, the heat generation amount calculator 51 prestores, in the storage unit 55, data such as a map indicating a correlation among applied voltage, the number of revolution, torque and iron loss $W_{YOKE}$ YOKE of the rotor yoke 24a. The heat generation amount calculator 51 calculates iron loss $W_{YOKE}$ of the rotor yoke 24a with reference to data prestored in the storage unit 55 by using applied voltage, the number of revolution and torque detected by the sensors 41, 44, 46. The heat generation amount calculator 51 calculates, for example, the iron loss $W_{YOKE}$ with respect to multiple different combinations of applied voltages (Va<Vb) and numbers of revolution (N1<N2<N3) by using a map indicating a correlation between the torque and the iron loss $W_{YOKE}$ while performing linear interpolation for the applied voltage and the number of revolution.

Figure 6:
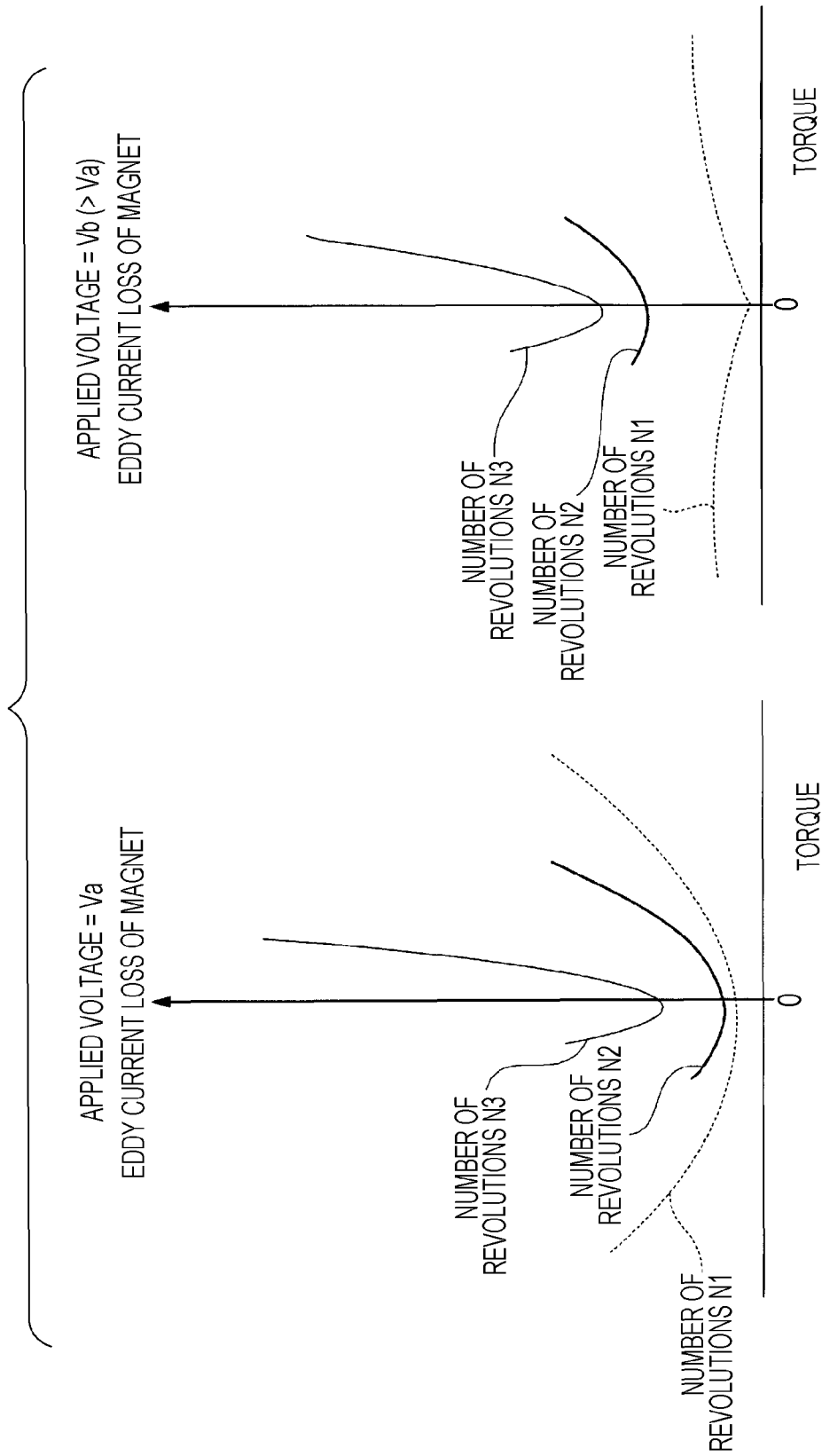
FIG. 6 is a diagram illustrating a correlation among applied voltage, revolution, torque, and eddy current loss of the magnet in the driving motor of the temperature estimation device for a rotating electric machine according to the embodiment of the present disclosure.

The heat generation amount calculator 51 calculates eddy current loss $W_{MAG}$ of the magnet 23 according to applied voltage detected by the voltage sensor 41, the number of revolution of the driving motor 11 detected by the first revolution number sensor 44, and torque of the driving motor 11 detected by the torque sensor 46. As illustrated in FIG. 6, the heat generation amount calculator 51 prestores, in the storage unit 55, data such as a map indicating a correlation among applied voltage, the number of revolution, torque and eddy current loss $W_{MAG}$ of the magnet 23. The heat generation amount calculator 51 calculates eddy current loss $W_{MAG}$ of the magnet 23 with reference to data prestored in the storage unit 55 by using applied voltage, the number of revolution and torque detected by the sensors 41, 44, 46. The heat generation amount calculator 51 calculates, for example, eddy current loss $W_{MAG}$ for multiple different combinations of applied voltages (Va<Vb) and the numbers of revolution (N1<N2<N3) by using a map indicating a correlation between torque and eddy current loss $W_{MAG}$ while performing linear interpolation for applied voltage and the number of revolution.

The dropped coolant temperature calculator 52 calculates temperature of the coolant that has passed through the cooling device 14b, according to temperature of the coolant stored in the coolant storage unit and detected by the coolant temperature sensor 47, the number of revolution of the driving motor 11 detected by the first revolution number sensor 44, and the number of revolution of the power generation motor 12 detected by the second revolution number sensor 45. The dropped coolant temperature calculator 52 calculates temperature $T_{DATF}$ of the dropped coolant according to temperature of the coolant that has passed through the cooling device 14b, the number of revolution of the power generation motor 12 detected by the second revolution number sensor 45, and coil temperature detected by the coil temperature sensor 48.

Figure 7:
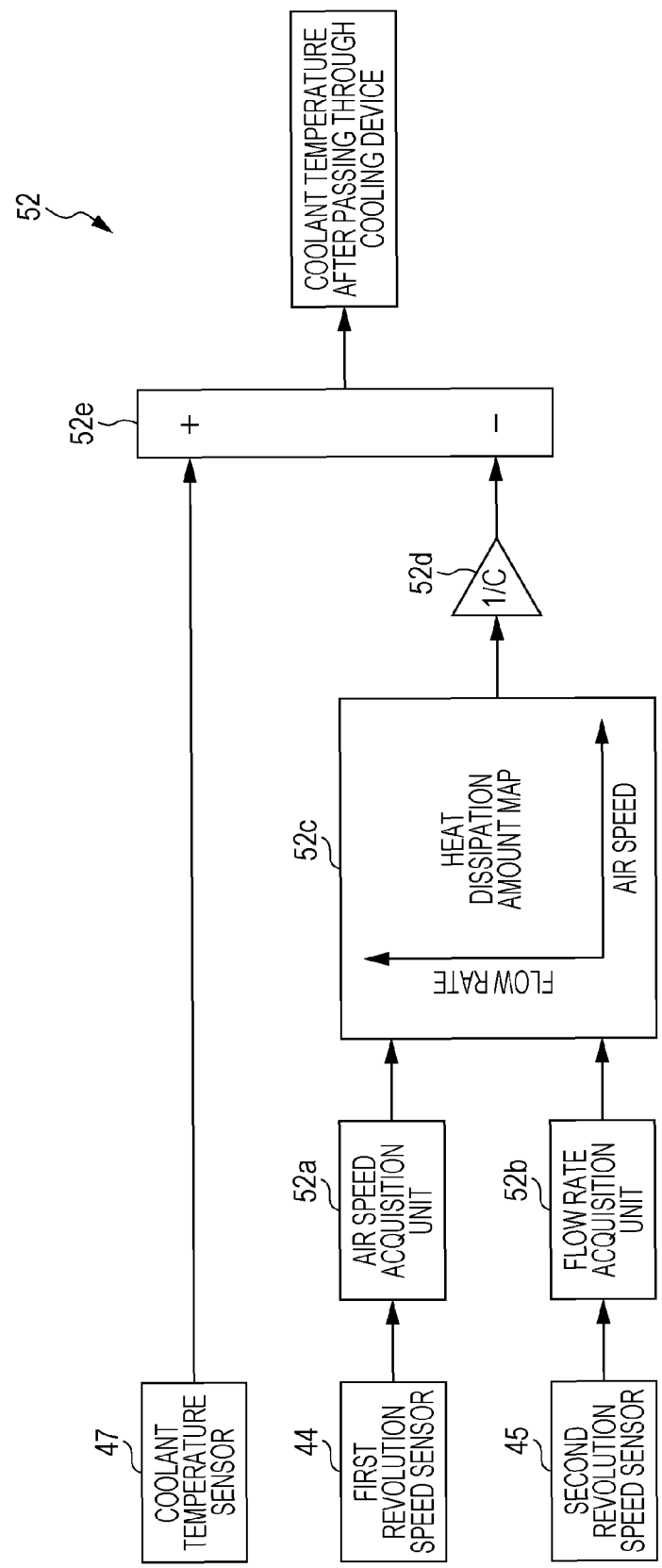
FIG. 7 is a block diagram illustrating a partial function configuration of a dropped coolant temperature calculator of the temperature estimation device for a rotating electric machine according to the embodiment of the present disclosure.

As illustrated in FIG. 7, the dropped coolant temperature calculator 52 includes an air speed acquisition unit 52a, a flow rate acquisition unit 52b, a heat dissipation amount acquisition unit (a heat dissipation amount calculator) 52c, a dissipation temperature calculator 52d, and a coolant temperature calculator 52e.

The air speed acquisition unit 52a is configured to acquire air speed of the cooling air based on a physical quantity correlating with air speed of the cooling air cooling down the coolant in the cooling device 14b. The air speed acquisition unit 52a acquires air speed of the cooling air, for example, based on the speed of the vehicle 1 as a physical quantity correlating with air speed of the cooling air. The air speed acquisition unit 52a acquires the speed of the vehicle 1 based on various parameters such as the number of revolution of the driving motor 11 detected by the first revolution number sensor 44 and reduction ratio of the transmission 13. The various parameters include information related to the prestored tire size of the drive wheel W and the reduction ratio of the transmission 13 contained in a control signal outputted from the controller 17. The air speed acquisition unit 52a prestores, for example, data such as a map indicating a correspondence relationship between the speed of the vehicle 1 and the air speed of the cooling air. The air speed acquisition unit 52a acquires the air speed of the cooling air in the cooling device 14b with reference to prestored data by using the speed of the vehicle 1.

Figure 8:
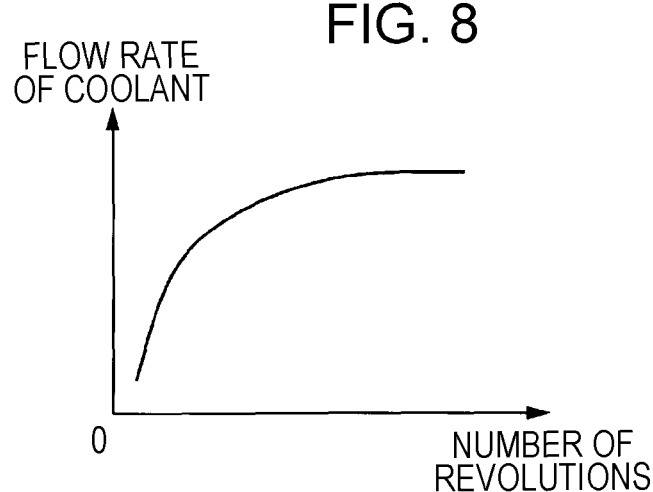
FIG. 8 is a diagram illustrating a correlation between the number of revolution (a speed of revolution) of the power generation motor and flow rate of the coolant of the temperature estimation device for a rotating electric machine according to the embodiment of the present disclosure.

The flow rate acquisition unit 52b is configured to acquire flow rate of the coolant based on a physical quantity correlating with flow rate of the coolant in the cooling device 14b. The flow rate acquisition unit 52b acquires flow rate of the coolant, for example, based on the number of revolution of the mechanical pump 14c as the physical quantity correlating with flow rate of the coolant. The flow rate acquisition unit 52b acquires the number of revolution of the mechanical pump 14c drivingly coupled with the rotating shaft of the power generation motor 12 based on the number of revolution of the power generation motor 12 detected by the second revolution number sensor 45. As illustrated in FIG. 8, the flow rate acquisition unit 52b prestores data such as a map indicating a correspondence relationship between the number of revolution of the mechanical pump 14c and flow rate of the coolant. The flow rate acquisition unit 52b acquires flow rate of the coolant in the cooling device 14b with reference to prestored data by using the number of revolution of the mechanical pump 14c based on the number of revolution of the power generation motor 12 detected by the second revolution number sensor 45.

As illustrated in FIG. 7, the heat dissipation amount acquisition unit 52c is configured to prestore data such as a map indicating a correspondence relationship among air speed of the cooling air in the cooling device 14b, flow rate of the coolant in the cooling device 14b and heat dissipation amount of the coolant in the cooling device 14b. The heat dissipation amount acquisition unit 52c acquires heat dissipation amount of the coolant in the cooling device 14b with reference to prestored data by using air speed of the cooling air in the cooling device 14b acquired by the air speed acquisition unit 52a and flow rate of the coolant in the cooling device 14b acquired by the flow rate acquisition unit 52b.

The dissipation temperature calculator 52d is configured to calculate a temperature (dissipation temperature) corresponding to heat dissipation amount of the coolant by using the heat dissipation amount of the coolant in the cooling device 14b acquired by the heat dissipation amount acquisition unit 52c and the heat capacity $C_{atf}$ of the coolant. The dissipation temperature calculator 52d calculates, for example, the heat capacity $C_{atf}$ of the coolant based on flow rate of the coolant in the cooling device 14b acquired by the flow rate acquisition unit 52b and the prestored specific heat C. The dissipation temperature calculator 52d calculates dissipation temperature by dividing the heat dissipation amount of the coolant in the cooling device 14b acquired by the heat dissipation amount acquisition unit 52c by the heat capacity $C_{atf}$ of the coolant.

The coolant temperature calculator 52e is configured to calculate temperature of the coolant that has passed through the cooling device 14b, based on temperature of the coolant in the coolant storage unit detected by the coolant temperature sensor 47 and dissipation temperature calculated by the dissipation temperature calculator 52d. The coolant temperature calculator 52e calculates, for example, a coolant temperature after passing through the cooling device 14b (coolant temperature $T_{atf}$ after passing through the cooling device), by subtracting the dissipation temperature from the temperature of the coolant in the coolant storage unit detected by the coolant temperature sensor 47.

Figure 9:
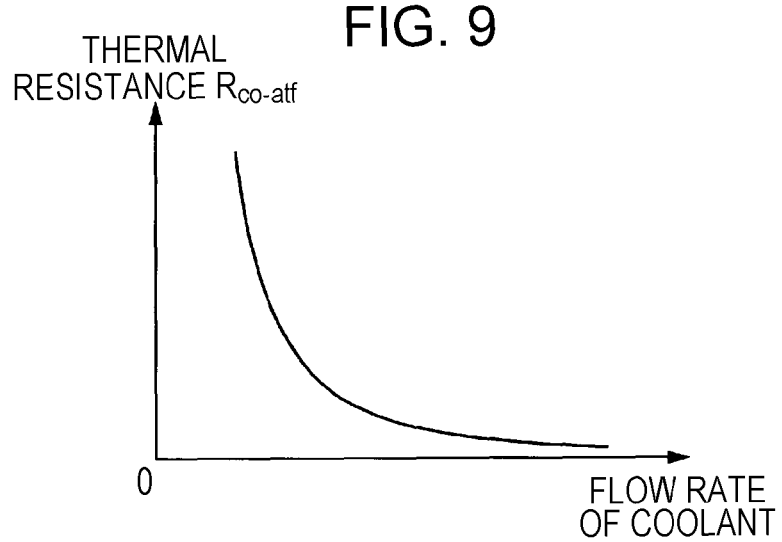
FIG. 9 is a diagram illustrating a correlation between thermal resistance between a dropped coolant and a three phase coil and flow rate of the coolant in the driving motor of the temperature estimation device for a rotating electric machine according to the embodiment of the present disclosure.

The dropped coolant temperature calculator 52 is configured to calculate received heat amount $Q_{co-atf}$ from the three phase coil 21 of the dropped coolant according to the coolant temperature $T_{atf}$ after passing through the cooling device calculated by the coolant temperature calculator 52e, coil temperature detected by the coil temperature sensor 48 and flow rate of the coolant acquired by the flow rate acquisition unit 52b. As illustrated in FIG. 9, the dropped coolant temperature calculator 52 prestores, in the storage unit 55, data such as a map indicating a correlation between thermal resistance $R_{co-atf}$ between the dropped coolant and the three phase coil 21 and flow rate of the coolant. The dropped coolant temperature calculator 52 acquires the thermal resistance $R_{co-atf}$ between the dropped coolant and the three phase coil 21 with reference to data prestored in the storage unit 55 by using the acquired flow rate of the coolant. As indicated in a formula (1) below, the dropped coolant temperature calculator 52 calculates the received heat amount $Q_{co-atf}$ by using the acquired thermal resistance $R_{co-atf}$, the coolant temperature $T_{atf}$ after passing through the cooling device and the coil temperature $T_{co}$.

$$Q_{co-atf} = \frac{T_{co} - T_{atf}}{R_{co-atf}} \quad (1)$$

The dropped coolant temperature calculator 52 calculates temperature $T_{DATF}$ of the dropped coolant according to the calculated received heat amount $Q_{co-atf}$, the heat capacity $C_{atf}$ of the coolant, and the coolant temperature $T_{atf}$ after passing through the cooling device. As indicated in a formula (2) below, the dropped coolant temperature calculator 52 calculates temperature change $\Delta T_{atf}$ of the coolant by using the calculated received heat amount $Q_{co-atf}$ and the heat capacity $C_{atf}$ of the coolant. As indicated in a formula (3) below, the dropped coolant temperature calculator 52 calculates temperature $T_{DATF}$ of the dropped coolant by using the calculated temperature change $\Delta T_{atf}$ of the coolant and the coolant temperature $T_{atf}$ after passing through the cooling device.

$$\Delta T_{atf} = \frac{Q_{co-atf}}{C_{atf}} = \frac{Q_{co-atf}}{F_{atf} \times C \times A} \quad (2)$$

$$T_{DATF} = T_{atf} + \Delta T_{atf} \quad (3)$$

The part temperature calculator 53 is configured to estimate temperature of a predetermined part that exchanges heat with the coolant in each of the driving motor 11 and the power generation motor 12. The part temperature calculator 53 calculates, for example, temperature $T_{MAG}$ of the magnet 23 of the driving motor 11.

Figure 10:
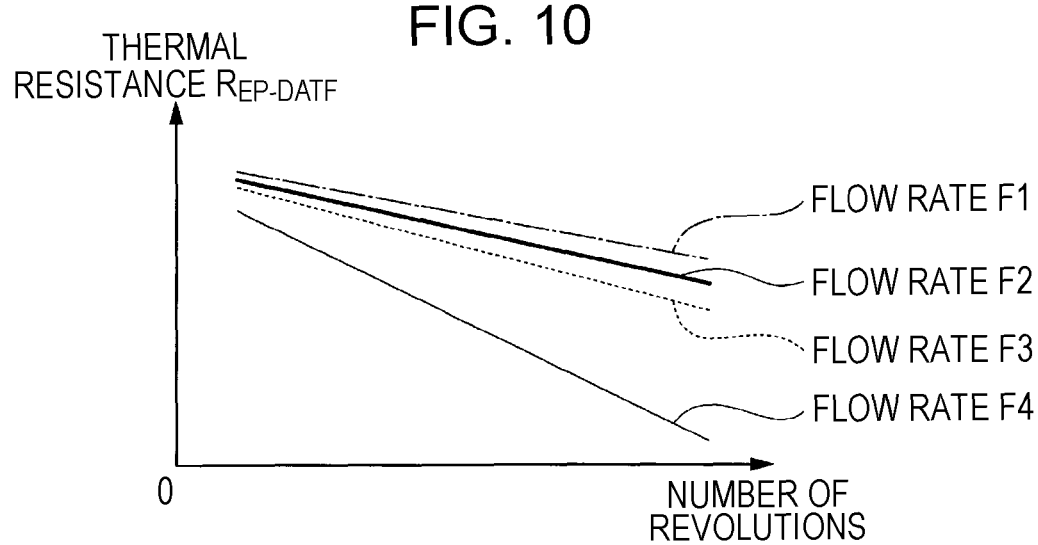
FIG. 10 is a diagram illustrating a correlation among thermal resistance between a dropped coolant and an end face plate, flow rate of the coolant, and revolution in the driving motor of the temperature estimation device for a rotating electric machine according to the embodiment of the present disclosure.

The part temperature calculator 53 calculates thermal resistance $R_{EP-DATF}$ between the dropped coolant and the end face plate 24b according to the number of revolution of the driving motor 11 detected by the first revolution number sensor 44 and flow rate $F_{atf}$ of the coolant acquired by the flow rate acquisition unit 52b. As illustrated in FIG. 10, the part temperature calculator 53 prestores, in the storage unit 55, data such as a map indicating a correlation among thermal resistance $R_{EP-DATF}$ between the dropped coolant and the end face plate 24b, flow rate $F_{atf}$ of the coolant, and the number of revolution of the driving motor 11. The part temperature calculator 53 calculates thermal resistance $R_{EP-DATF}$ between the dropped coolant and the end face plate 24b with reference to data prestored in the storage unit 55 by using flow rate $F_{atf}$ of the coolant and the number of revolution of the driving motor 11. The part temperature calculator 53 calculates, for example, the thermal resistance $R_{EP-DATF}$ for multiple different flow rates $F_{atf}$ (F1<F2<F3<F4) of the coolant by using a map indicating a correlation between the number of revolution and the thermal resistance $R_{EP-DATF}$ while performing linear interpolation for the flow rate $F_{atf}$.

The part temperature calculator 53 calculates temperature $T_{MAG}$ of the magnet 23 according to the calculated thermal resistance $R_{EP-DATF}$, temperature $T_{DATF}$ of the dropped coolant calculated by the dropped coolant temperature calculator 52, iron loss $W_{YOKE}$ of the rotor yoke 24a calculated by the heat generation amount calculator 51, and eddy current loss $W_{MAG}$ of the magnet 23. As indicated in a formula (4) below, the part temperature calculator 53 calculates temperature $T_{EP}$ of the end face plate 24b by using a previous value of the temperature $T_{EP}$ (pre) of the end face plate 24b stored in the storage unit 55 and a temperature change $\Delta T_{EP}$ of the end face plate 24b. The part temperature calculator 53 estimates the temperature change $\Delta_{TEP}$ of the end face plate 24b, for example, by an appropriate arithmetic operation.

$$T_{EP} = T_{EP}(\text{pre}) + \Delta T_{EP} \quad (4)$$

As indicated in a formula (5) below, the part temperature calculator 53 calculates received heat amount $Q_{EP-DATF}$ from the end face plate 24b of the dropped coolant by using the calculated thermal resistance $R_{EP-DATF}$ between the dropped coolant and the end face plate 24b, temperature $T_{EP}$ of the end face plate 24b and temperature $T_{DATF}$ of the dropped coolant.

As indicated in a formula (6) below, the part temperature calculator 53 assumes that the received heat amount $Q_{YOKE-EP}$ from the rotor yoke 24a of the end face plate 24b is equal to the received heat amount $Q_{EP-DATF}$ from the end face plate 24b of the dropped coolant.

$$Q_{EP-DATF} = \frac{T_{EP} - T_{DATF}}{R_{EP-DATF}} \quad (5)$$

$$Q_{YOKE-EP} = Q_{EP-DATF} \quad (6)$$

The part temperature calculator 53 calculates received heat amount $Q_{MAG-YOKE}$ from the magnet 23 of the rotor yoke 24a by using the previous value of the temperature $T_{MAG}$ (pre) of the magnet 23 stored in the storage unit 55, thermal resistance $R_{MAG-YOKE}$ between the rotor yoke 24a and the magnet 23 and estimated value of the temperature $T_{YOKE}$ (est) of the rotor yoke 24a. The part temperature calculator 53 calculates received heat amount $Q_{MAG-YOKE}$ by dividing the difference between the estimation value $T_{YOKE}$ (est) and the previous value $T_{MAG}$ (pre) by the thermal resistance $R_{MAG-YOKE}$. The part temperature calculator 53 stores, for example, a predetermined constant value in the storage unit 55 as the thermal resistance $R_{MAG-YOKE}$ between the rotor yoke 24a and the magnet 23. The part temperature calculator 53 estimates an estimated value of the temperature $T_{YOKE}$ (est) of the rotor yoke 24a, for example, by an appropriate arithmetic operation.

As indicated in a formula (7) below, the part temperature calculator 53 calculates received heat amount $Q_{YOKE}$ of the rotor yoke 24a by using the calculated received heat amount $Q_{YOKE-EP}$ from the rotor yoke 24a of the end face plate 24b, the received heat amount $Q_{MAG-YOKE}$ from the magnet 23 of the rotor yoke 24a and the iron loss $W_{YOKE}$ of the rotor yoke 24a.

$$Q_{YOKE} = W_{YOKE} + Q_{MAG-YOKE} - Q_{YOKE-EP} \tag{7}$$

As indicated in a formula (8) below, the part temperature calculator 53 calculates temperature change $\Delta_{TYOKE}$ of the rotor yoke 24a by using the heat capacity $C_{YOKE}$ of the rotor yoke 24a stored in the storage unit 55 and the calculated received heat amount $Q_{YOKE}$ of the rotor yoke 24a.

As indicated in a formula (9) below, the part temperature calculator 53 calculates temperature $T_{YOKE}$ of the rotor yoke 24a by using the previous value of the temperature $T_{YOKE}$ (pre) of the rotor yoke 24a stored in the storage unit 55 and the calculated temperature change $\Delta T_{YOKE}$ of the rotor yoke 24a.

$$\Delta T_{YOKE} = \frac{Q_{YOKE}}{C_{YOKE}} \tag{8}$$

$$T_{YOKE} = T_{YOKE}(pre) + \Delta T_{YOKE} \tag{9}$$

As indicated in a formula (10) below, the part temperature calculator 53 calculates heat removal amount (heat dissipation amount) from the magnet 23 by using the previous value of the temperature $T_{MAG}$ (pre) of the magnet 23 stored in the storage unit 55, the thermal resistance $R_{MAG-YOKE}$ between the rotor yoke 24a and the magnet 23 and the calculated temperature $T_{YOKE}$ of the rotor yoke 24a.

As indicated in a formula (11) below, the part temperature calculator 53 calculates the temperature change $\Delta T_{MAG}$ of the magnet 23 by using the heat capacity $C_{MAG}$ of the magnet 23 stored in the storage unit 55, the calculated heat removal amount $Q_{MAG}$ and the eddy current loss $W_{MAG}$ of the magnet 23.

As indicated in a formula (12) below, the part temperature calculator 53 calculates the temperature $T_{MAG}$ of magnet 23 by using the previous value of the temperature $T_{MAG}$ (pre) of the magnet 23 stored in the storage unit 55 and the calculated temperature change $\Delta T_{MAG}$ of the magnet 23.

$$Q_{MAG} = \frac{T_{MAG}(pre) - T_{YOKE}}{R_{MAG-YOKE}} \tag{10}$$

$$\Delta T_{MAG} = \frac{(W_{MAG} - Q_{MAG})}{C_{MAG}} \tag{11}$$

$$T_{MAG} = T_{MAG}(pre) + \Delta T_{MAG} \tag{12}$$

The motor control unit 54 is configured to control the driving motor 11 and the power generation motor 12 by outputting a control signal for controlling the transmission 13 and the power conversion unit 15 based on the temperature of a predetermined part calculated by the part temperature calculator 53. The motor control unit 54 outputs, for example, a control signal for controlling the transmission 13 and the power conversion unit 15 based on the temperature $T_{MAG}$ of the magnet 23 of the driving motor 11.

The temperature estimation device 10 of the rotating electric machine according to the present embodiment includes the above components. Next, operation of the temperature estimation device 10 of the rotating electric machine is described.

Hereinafter, a process where the controller 17 controls the driving motor 11 by calculating the temperature $T_{MAG}$ of the magnet 23 of the driving motor 11 is described.

Figure 11:
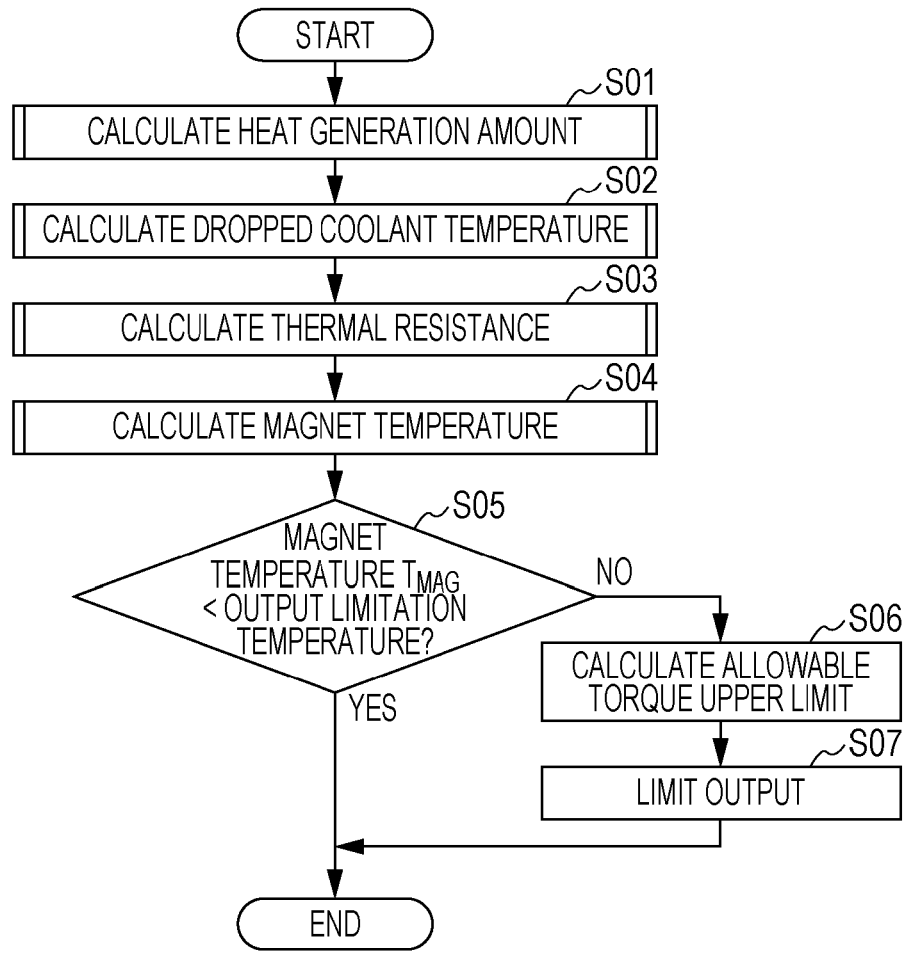
FIG. 11 is a flowchart illustrating the operation of the temperature estimation device for a rotating electric machine according to the embodiment of the present disclosure.

First, as illustrated in FIG. 11, the controller 17 calculates a heat generation amount caused by a loss in sections of the driving motor 11 (step S01).

Next, the controller 17 calculates the temperature $T_{DATF}$ of the dropped coolant (step S02).

Next, the controller 17 calculates the thermal resistance $R_{EP-DATF}$ between the dropped coolant and the end face plate 24b (step S03).

Next, the controller 17 calculates the temperature $T_{MAG}$ of the magnet 23 (step S04).

Next, the controller 17 determines whether the calculated temperature $T_{MAG}$ of the magnet 23 is lower than a predetermined output limitation temperature (step S05).

When the determination result is "YES" (YES in the step S05), the controller 17 ends the processing without limiting output of the driving motor 11.

Meanwhile, when the determination result is "NO" (NO in the step S05), the controller 17 proceeds the process to the step S06.

Then, the controller 17 calculates an allowable torque upper limit of the driving motor 11 (step S06).

Next, the controller 17 outputs a control signal instructing to reduce torque of the driving motor 11 down to less than the allowable torque upper limit to the power conversion unit 15 (step S07). Then, the controller 17 ends the processing.

Hereinafter, the heat generation amount calculation processing in the above step S01 is described.

Figure 12:
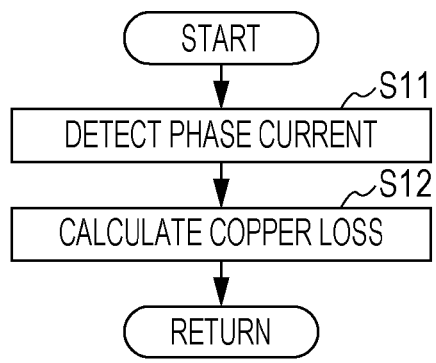
FIG. 12 is a flowchart illustrating one of heat generation amount calculation processings illustrated in FIG. 11.

First, as illustrated in FIG. 12, the controller 17 acquires the three-phase phase current (that is, AC current of the three phase coil 21) of the driving motor 11 outputted by the second current sensor 43 (step S11).

Next, the controller 17 calculates copper loss of the three phase coil 21 according to the acquired phase current of the three phase coil 21 and the resistance value of the three phase coil 21 prestored in the storage unit 55 (step S12). Then, the controller 17 ends the processing.

Figure 13:
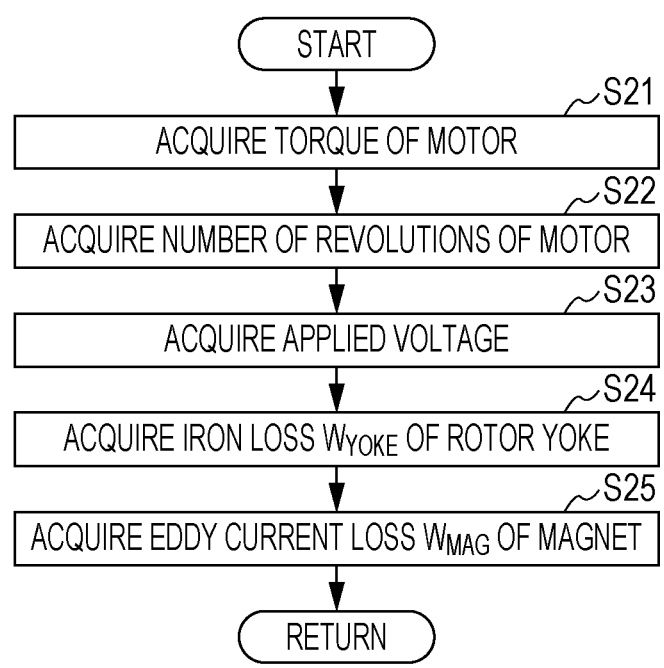
FIG. 13 is a flowchart illustrating another one of heat generation amount calculation processings illustrated in FIG. 11.

As illustrated in FIG. 13, the controller 17 also acquires the torque of the driving motor 11 detected by the torque sensor 46 (step S21).

Next, the controller 17 acquires the number of revolution of the driving motor 11 detected by the first revolution number sensor 44 (step S22).

Next, the controller 17 acquires the applied voltage detected by the voltage sensor 41 (step S23).

Next, the controller 17 calculates iron loss $W_{YOKE}$ of the rotor yoke 24a with reference to data prestored in the storage unit 55 by using the acquired torque, the number of revolution and the applied voltage. Then, the controller 17 stores the calculated iron loss $W_{YOKE}$ of the rotor yoke 24a into the storage unit 55 (step S24).

Next, the controller 17 calculates eddy current loss $W_{MAG}$ of the magnet 23 with reference to data prestored in the storage unit 55 by using the acquired torque, the number of revolution and the applied voltage. Then, the controller 17 stores the calculated eddy current loss $W_{MAG}$ of the magnet 23 into the storage unit 55 (step S25). Then, the controller 17 ends the processing.

Hereinafter, the dropped coolant temperature calculation processing in the above step S02 is described.

Figure 14:
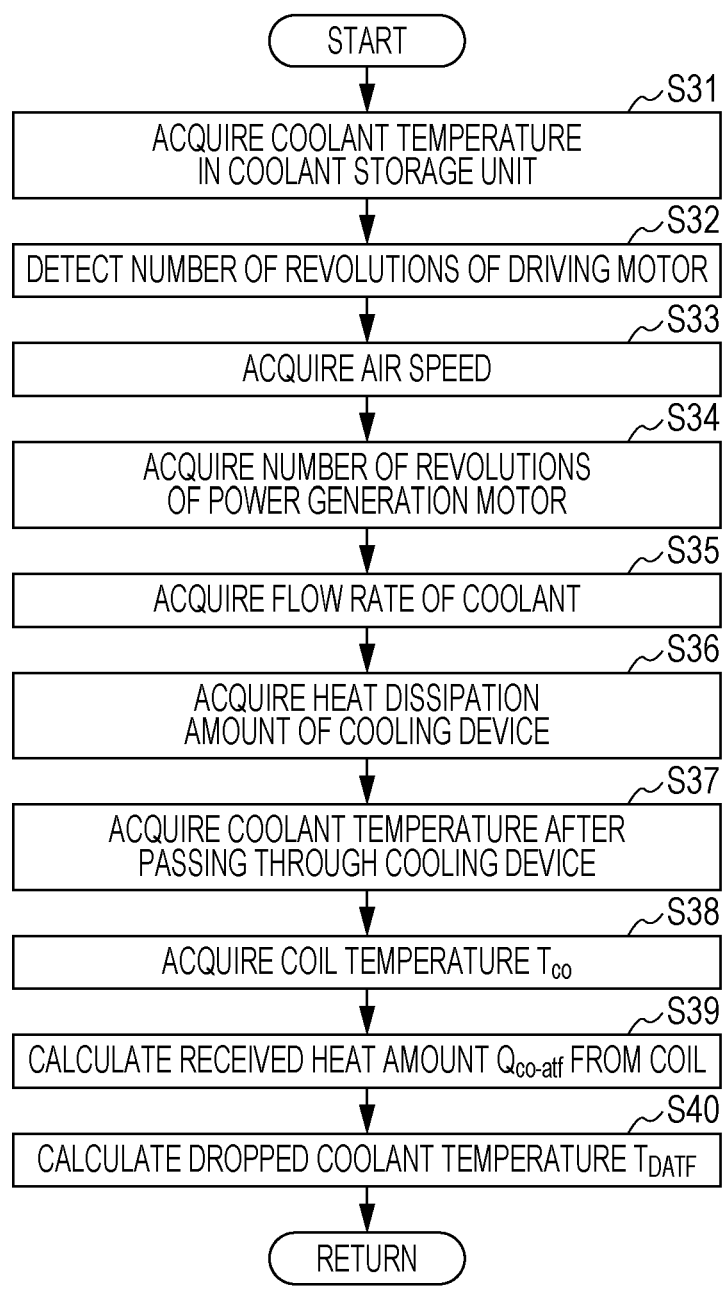
FIG. 14 is a flowchart illustrating a dropped coolant temperature calculation processing illustrated in FIG. 11.

First, as illustrated in FIG. 14, the controller 17 acquires the temperature of the coolant in the coolant storage unit detected by the coolant temperature sensor 47 (step S31).

Next, the controller 17 acquires the number of revolution of the driving motor 11 detected by the first revolution number sensor 44 (step S32).

Next, the controller 17 acquires the speed of the vehicle 1 based on various parameters such as the number of revolution of the driving motor 11 and the reduction ratio of the transmission 13. Then, the controller 17 acquires air speed of the cooling air in the cooling device 14b based on the speed of the vehicle 1 (step S33).

Next, the controller 17 acquires the number of revolution of the power generation motor 12 detected by the second revolution number sensor 45 (step S34).

Next, the controller 17 acquires the number of revolution of the mechanical pump 14c drivingly coupled with the rotating shaft of the power generation motor 12 based on the number of revolution of the power generation motor 12. Then, the controller 17 acquires flow rate of the coolant in the cooling device 14b based on the number of revolution of the mechanical pump 14c (step S35).

Next, the controller 17 acquires the heat dissipation amount of the coolant in the cooling device 14b by using air speed of the cooling air in the cooling device 14b and flow rate of the coolant in the cooling device 14b (step S36).

Next, the controller 17 calculates dissipation temperature of the coolant by using heat dissipation amount of the coolant in the cooling device 14b and the heat capacity $C_{atf}$ of the coolant. Then, the controller 17 calculates coolant temperature after passing through the cooling device 14b (coolant temperature $T_{atf}$ after passing through the cooling device) by subtracting the dissipation temperature from the temperature of the coolant in the coolant storage unit detected by the coolant temperature sensor 47 (step S37).

Next, the controller 17 acquires coil temperature $T_{co}$ detected by the coil temperature sensor 48 (step S38).

Next, the controller 17 calculates thermal resistance $R_{co-atf}$ between the dropped coolant and the three phase coil 21 with reference to data prestored in the storage unit 55 by using the flow rate $F_{atf}$ of the coolant. Then, as indicated in the above formula (1), the controller 17 calculates the received heat amount $Q_{co-atf}$ by using the thermal resistance $R_{co-atf}$, the coolant temperature $T_{atf}$ after passing through the cooling device and the coil temperature $T_{co}$ (step S39).

Next, as indicated in the above formula (2), the controller 17 calculates temperature change $\Delta T_{atf}$ of the coolant by using the received heat amount $Q_{co-atf}$ and the heat capacity $C_{atf}$ of the coolant. Then, as indicated in the above formula (3), the controller 17 calculates temperature $T_{DATF}$ of the dropped coolant by using the temperature change $\Delta T_{atf}$ of the coolant and the coolant temperature $T_{atf}$ after passing through the cooling device. Then, the controller 17 stores the calculated temperature of the dropped coolant into the storage unit 55 (step S40). Then, the controller 17 ends the processing.

Hereinafter, the thermal resistance calculation processing in the above step S03 is described.

Figure 15:
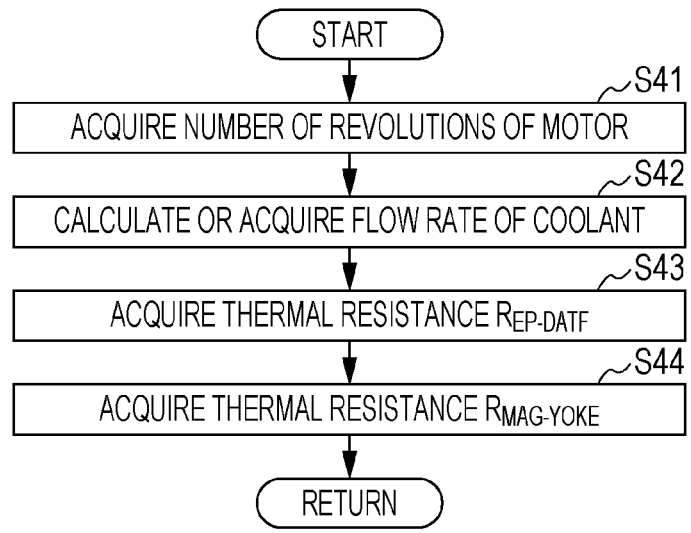
FIG. 15 is a flowchart illustrating a thermal resistance calculation processing illustrated in FIG. 11.

First, as illustrated in FIG. 15, the controller 17 acquires the number of revolution of the driving motor 11 (step S41).

Next, the controller 17 calculates or acquires flow rate $F_{atf}$ of the coolant (step S42).

Next, the controller 17 calculates thermal resistance $R_{EP-DATF}$ between the dropped coolant and the end face plate 24b with reference to data prestored in the storage unit 55 by using the flow rate $T_{atf}$ of the coolant and the number of revolution of the driving motor 11. Then, the controller 17 stores the calculated thermal resistance $R_{EP-DATF}$ into the storage unit 55 (step S43).

Next, the controller 17 acquires thermal resistance $R_{MAG-YOKE}$ between the rotor yoke 24a and the magnet 23 that is a predetermined constant value prestored in the storage unit 55 (step S44). Then, the controller 17 ends the processing.

Hereinafter, the magnet temperature calculation processing in the above step S04 is described.

Figure 16:
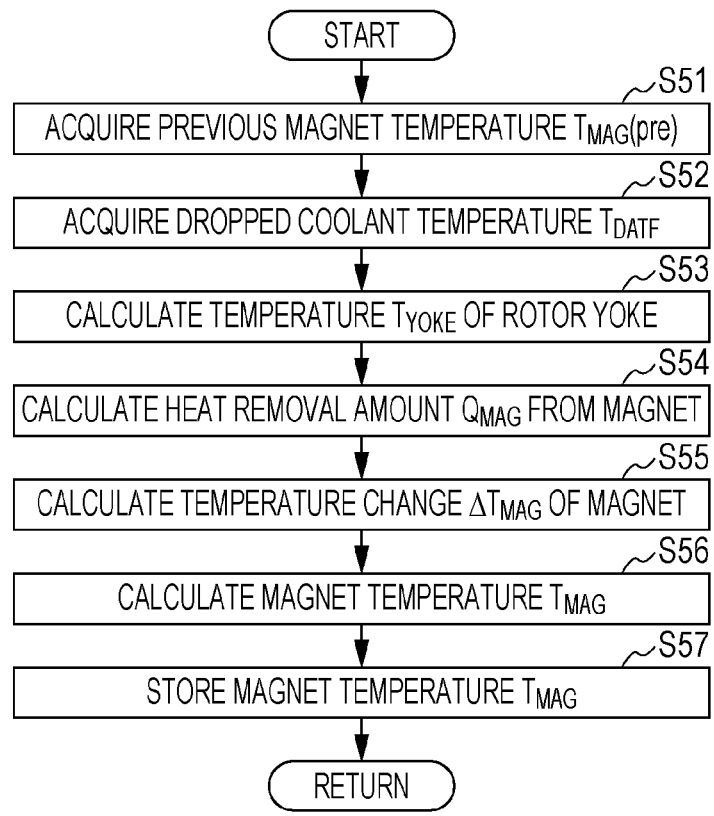
FIG. 16 is a flowchart illustrating a magnet temperature calculation processing illustrated in FIG. 11.

First, as illustrated in FIG. 16, the controller 17 acquires the previous value of the temperature $T_{MAG}$ (pre) of the magnet 23 stored in the storage unit 55 (step S51).

Next, the controller 17 calculates the temperature $T_{DATF}$ of the dropped coolant (step S52).

Next, as indicated in the above formula (4), the controller 17 calculates temperature $T_{EP}$ of the end face plate 24b by using the previous value of the temperature $T_{EP}$ (pre) of the end face plate 24b stored in the storage unit 55 and the temperature change $\Delta T_{EP}$ of the end face plate 24b. Then, the controller 17 stores the calculated temperature of the end face plate 24b into the storage unit 55. Then, as indicated in the above formula (5), the controller 17 calculates received heat amount $Q_{EP-DATF}$ from the end face plate 24b of the dropped coolant by using the thermal resistance $R_{EP-DATF}$ between the dropped coolant and the end face plate 24b, the temperature $T_{EP}$ of the end face plate 24b and the temperature $T_{DATF}$ of the dropped coolant. Then, as indicated in the above formula (6), the controller 17 assumes that the received heat amount $Q_{YOKE-EP}$ from the rotor yoke 24a of the end face plate 24b is equal to the received heat amount $Q_{EP-DATF}$ from the end face plate 24b of the dropped coolant. Then, the controller 17 calculates received heat amount $Q_{MAG-YOKE}$ from the magnet 23 of the rotor yoke 24a by using the previous value of the temperature $T_{MAG}$ (pre) of the magnet 23 stored in the storage unit 55, the thermal resistance $R_{MAG-YOKE}$ between the rotor yoke 24a and the magnet 23 and the estimated value of the temperature $T_{YOKE}$ (est) of the rotor yoke 24a. Then, as indicated in the above formula (7), the controller 17 calculates received heat amount $Q_{YOKE}$ of the rotor yoke 24a by using the received heat amount $Q_{YOKE-EP}$ from the rotor yoke 24a of the end face plate 24b, the received heat amount $Q_{MAG-YOKE}$ from the magnet 23 of the rotor yoke 24a and the iron loss $W_{YOKE}$ of the rotor yoke 24a. Then, as indicated in the above formula (8), the controller 17 calculates temperature change $\Delta T_{YOKE}$ of the rotor yoke 24a by using the heat capacity $C_{YOKE}$ of the rotor yoke 24a stored in the storage unit 55 and the received heat amount $Q_{YOKE}$ of the rotor yoke 24a. Then, as indicated in the above formula (9), the controller 17 calculates the temperature $T_{YOKE}$ of the rotor yoke 24a by using the previous value of the temperature $T_{YOKE}$ (pre) of the rotor yoke 24a stored in the storage unit 55 and the temperature change $\Delta T_{YOKE}$ of the rotor yoke 24a. Then, the controller 17 stores the calculated temperature $T_{YOKE}$ of the rotor yoke 24a into the storage unit 55 (step S53).

Next, as indicated in the above formula (10), the controller 17 calculates heat removal amount $Q_{MAG}$ from the magnet 23 by using the previous value of the temperature $T_{MAG}$ (pre) of the magnet 23 stored in the storage unit 55, the thermal resistance $R_{MAG-YOKE}$ between the rotor yoke 24a and the magnet 23 and the temperature $T_{YOKE}$ of the rotor yoke 24a (step S54).

Next, as indicated in the above formula (11), the controller 17 calculates temperature change $\Delta T_{MAG}$ of the magnet 23 by using the heat capacity $C_{MAG}$ of the magnet 23 stored in the storage unit 55, the heat removal amount $Q_{MAG}$ and the eddy current loss $W_{MAG}$ of the magnet 23 (step S55).

Next, as indicated in the above formula (12), the controller 17 calculates temperature $T_{MAG}$ of magnet 23 by using the previous value of the temperature $T_{MAG}$ (pre) of the magnet 23 stored in the storage unit 55 and the temperature change $\Delta T_{MAG}$ of the magnet 23 (step S56).

Next, the controller 17 stores the calculated temperature $T_{MAG}$ of the magnet 23 into the storage unit 55 (step S57). Then, the controller 17 ends the processing.

As described above, the temperature estimation device 10 of the rotating electric machine according to the present embodiment estimates temperature of a predetermined part that exchanges heat with the coolant by using the coolant temperature $T_{atf}$ after passing through the cooling device. Thus, accuracy of temperature estimation may be improved compared with a case using the coolant temperature at the other position. For example, like temperature of the coolant in the coolant storage unit detected by the coolant temperature sensor 47, temperature of the coolant exchanging heat with a predetermined part may be acquired more accurately compared with a case using temperature of the coolant before passing through the cooling device 14b. Thus, temperature of a predetermined part exchanging heat with the coolant may be estimated accurately. Since heat dissipation amount of the coolant may be acquired accurately based on the physical quantity correlating with air speed of the cooling air that cools down the coolant in the cooling device 14b, accuracy of the coolant temperature $T_{atf}$ after passing through the cooling device may be enhanced.

Further, based on the number of revolution of the driving motor 11 detected by the first revolution number sensor 44, speed of the vehicle 1 correlating with air speed of the cooling air may be acquired in a convenient and accurate manner. Thus, complication of the device configuration may be suppressed, and air speed of the cooling air in the cooling device 14b may be acquired accurately as well.

Further, based on the number of revolution of the power generation motor 12 detected by the second revolution number sensor 45, the number of revolution of the mechanical pump 14c being a physical amount correlating with the flow rate of the coolant may be acquired in a convenient and accurate manner. Thus, complication of the device configuration may be suppressed, and the flow rate of the coolant in the cooling device 14b may be acquired accurately as well.

Further, the coolant temperature $T_{atf}$ after passing through the cooling device may be acquired in a convenient and accurate manner by using heat dissipation amount of the coolant based on the air speed of the cooling air in the cooling device 14b and the flow rate of the coolant and temperature of the coolant in the coolant storage unit detected by the coolant temperature sensor 47. Temperature estimation accuracy of a predetermined part may be improved by using the coolant temperature $T_{atf}$ after passing the cooling device which is not so much different from the temperature of the coolant actually exchanging heat with the predetermined part of the driving motor 11 and the power generation motor 12.

Further, complication of the system configuration may be prevented and the coolant temperature $T_{atf}$ after passing through the cooling device may be acquired by using the coolant temperature sensor 47 disposed in advance before the cooling device 14b in the coolant flow passage 14a. Also, for example, compared with a case where a temperature sensor for detecting temperature of the coolant which has passed through the cooling device 14b is newly disposed downstream of the cooling device 14b in the coolant flow passage 14a, increase of the pressure loss of the coolant may be prevented and thereby increase of energy consumption for circulating the coolant may be suppressed. The coolant temperature $T_{atf}$ after passing through the cooling device may be acquired accurately by considering an effect of the heat dissipation amount of the coolant in the cooling device 14b on the temperature of the coolant detected by the coolant temperature sensor 47 before the cooling device 14b in the coolant flow passage 14a. As the coolant temperature $T_{atf}$ after passing through the cooling device is known, temperature of a predetermined part cooled down by the coolant may be estimated accurately.

In the embodiment described above, the controller 17 acquires the speed of the vehicle 1 that is a physical quantity correlating with the air speed of the cooling air, based on the number of revolution of the driving motor 11 detected by the first revolution number sensor 44. However, it is not limited thereto.

For example, the controller 17 may acquire the vehicle speed detected by a speed sensor normally provided on the vehicle 1 where the temperature estimation device 10 of the rotating electric machine is mounted. Also, an air speed sensor configured to directly detect the air speed may be provided on the vehicle 1 where the temperature estimation device 10 of the rotating electric machine is mounted, and the controller 17 may acquire the air speed detected by the air speed sensor.

Also, for example, the controller 17 may acquire the physical quantity correlating with the air speed of the cooling air based on the number of revolution of the drive shaft of the vehicle 1 to which the rotating shaft of the driving motor 11 is coupled.

In the embodiment described above, the controller 17 acquires the heat dissipation amount of the coolant in the cooling device 14b by using the air speed of the cooling air in the cooling device 14b and the flow rate of the coolant in the cooling device 14b. However, it is not limited thereto.

The controller 17 may acquire the heat dissipation amount of the coolant in the cooling device 14b by using at least any one of the air speed of the cooling air in the cooling device 14b and the flow rate of the coolant. For example, when the first revolution number sensor 44 or the second revolution number sensor 45 is in failure or the like, the controller 17 may acquire the heat dissipation amount in the cooling device 14b in a convenient manner by using the air speed of the cooling air in the cooling device 14b or the flow rate of the coolant.

In the embodiment described above, the controller 17 estimates the temperature TAG of the magnet 23 of the driving motor 11 by using the coolant temperature $T_{atf}$ after passing through the cooling device. However, it is not limited thereto.

The controller 17 may estimate the temperature of a predetermined part of each of the driving motor 11 and the power generation motor 12 such as, for example, the coil 21 and the stator core 22a as a predetermined part exchanging heat with the coolant temperature after passing through the cooling device 14b, by using the coolant temperature $T_{atf}$ after passing through the cooling device.

In a variant of the embodiment, the heat generation amount calculator 51 may calculate the heat generation amount of each of the copper loss and the eddy current loss of the three phase coil 21, the iron loss of the stator core 22a, the eddy current loss of the magnet 23, and the iron loss of the rotor yoke 24a. The heat generation amount calculator 51 may calculate the eddy current loss of the coil 21 and the magnet 23 and the iron loss of the stator core 22a and the rotor yoke 24a with reference to data prestored in the storage unit 55 by using applied voltage, revolution and torque detected by the sensors 41, 44, 46.

The controller 17 calculates the heat dissipation amount dissipated from the coil 21 to the coolant with reference to data prestored in the storage unit 55 by using the flow rate of the coolant, the coolant temperature $T_{atf}$ after passing through the cooling device and temperatures calculated in previous processings (for example, temperature of the stator core 22*a* and temperature of the coil 21). The storage unit 55 prestores the flow rate of the coolant, the coolant temperature $T_{atf}$ after passing through the cooling device, temperatures calculated in previous processings and data indicating the correlation between the coil 21 and the heat dissipation amount.

The controller 17 calculates the received heat amount of the coil 21 based on the copper loss and eddy current loss of the coil 21 and the heat removal amount (heat dissipation amount) of the coil 21. The controller 17 calculates the temperature change of the coil 21 based on the received heat amount of the coil 21 and the heat capacity of the coil 21 prestored in the storage unit 55. The part temperature calculator 53 calculates estimated temperature of the coil 21 in the current processing based on temperature of the coil 21 estimated in a previous processing and temperature change of the coil 21.

In this case, the coil temperature sensor 48 may be omitted, and in the above formula (1), temperature of the coil 21 estimated by the controller 17 may be used as the coil temperature $T_{co}$.

The controller 17 calculates the heat dissipation amount of the stator core 22*a* with reference to data prestored in the storage unit 55 by using the flow rate of the coolant, the coolant temperature $T_{atf}$ after passing through the cooling device and temperatures calculated in previous processings (for example, temperature of the stator core 22*a* and temperature of the coil 21). The storage unit 55 prestores the flow rate of the coolant, the coolant temperature $T_{atf}$ after passing through the cooling device, temperatures calculated in the previous processing and data indicating the correlation between the stator core 22*a* and the heat dissipation amount.

The controller 17 calculates the received heat amount of the stator core 22*a* based on the iron loss of the stator core 22*a* and the heat removal amount (heat dissipation amount) of the stator core 22*a*. The controller 17 calculates the temperature change of the stator core 22*a* based on the received heat amount of the stator core 22*a* and the heat capacity of the stator core 22*a* prestored in the storage unit 55. The controller 17 calculates the estimated temperature of the stator core 22*a* in the current processing based on temperature of the stator core 22*a* estimated in the previous processing and temperature change of the stator core 22*a*.

In the embodiment described above, the controller 17 calculates the heat removal amount $Q_{MAG}$ from the magnet 23 when the magnet 23 is held inside the rotor yoke 24*a* such that the magnet 23 is not in direct contact with the end face plate 24*b* in the driving motor 11. However, it is not limited thereto. For example, in the thermal model illustrated in FIG. 4, the controller 17 may calculate the heat removal amount $Q_{MAG}$ from the magnet 23 according to a case where the end face plate 24*b* or the rotor yoke 24*a* is omitted or according to a case where both the end face plate 24*b* and the rotor yoke 24*a* are omitted.

For example, a case where the magnet 23 is held by the rotor yoke 24*a* in direct contact with the end face plate 24*b* in the driving motor 11 corresponds to a case where the rotor yoke 24*a* is omitted in the thermal model illustrated in FIG. 3.

For example, a case where the end face plate 24*b* is omitted, and the dropped coolant is in contact with the magnet 23 in the driving motor 11 corresponds to a case where the end face plate 24*b* and the rotor yoke 24*a* are omitted in the thermal model illustrated in FIG. 4.

For example, a case where the end face plate 24*b* is omitted, and the dropped coolant is not in contact with the magnet 23 in the driving motor 11 corresponds to a case where the end face plate 24*b* is omitted in the thermal model illustrated in FIG. 4.

The controller 17 may calculate the heat removal amount $Q_{MAG}$ from the magnet 23 by using the same and received heat amount corresponding to each of the thermal models.

In the embodiment described above, the controller 17 acquires the flow rate of the coolant from the number of revolution of the power generation motor 12 since the mechanical pump 14*c* of the coolant circulation unit 14 is coupled with the rotating shaft of the power generation motor 12. However, it is not limited thereto. The coolant circulation unit 14 may include an electric pump separate from the power generation motor 12 in place of the mechanical pump 14*c*. The controller 17 may acquire the flow rate of the coolant based on the number of revolution of the electric pump.

In the embodiment described above, the temperature estimation device 10 of the rotating electric machine includes the torque sensor 46. However, it is not limited thereto, and the torque sensor 46 may be omitted. The controller 17 may acquire torque indication value according to the AC current flowing through the coils 21 of the driving motor 11 detected by the second current sensor 43 and rotation angle of the driving motor 11 detected by the first revolution number sensor 44.

In the embodiment described above, each of the driving motor 11 and the power generation motor 12 includes the coil 21 of SC (segment conductor) wound coil. However, it is not limited thereto. Each of the driving motor 11 and the power generation motor 12 may be a motor including another winding structure, such as, for example, concentrated winding or distributed winding.

The embodiment described above is presented as an example, and it is not intended to limit the scope of the present disclosure. The novel embodiment described above may be implemented in various other forms, and may be omitted, substituted or modified in various ways within the scope not deviating from the spirit of the present disclosure. The embodiment described above and variants thereof are included in the scope and the spirit of the present disclosure, in a scope equivalent to the present disclosure claimed in the appended claims.

The present disclosure adopts the following aspects:

(1) A temperature estimation device for a rotating electric machine according to an aspect of the present disclosure includes: a coolant dissipator (for example, a cooling device 14*b* in the embodiment) configured to cool down a coolant by heat exchange with cooling air outside the rotating electric machine, the coolant cooling down a rotating electric machine (for example, a driving motor 11 and a power generation motor 12 in the embodiment); a heat dissipation amount acquisition unit (for example, a heat dissipation amount acquisition unit 52*c* in the embodiment) configured to acquire heat dissipation amount of the coolant in the coolant dissipator based on a physical quantity correlating with air speed of the cooling air and a physical quantity correlating with flow rate of the coolant; a coolant temperature acquisition unit (for example, a coolant temperature calculator 52*e* in the embodiment) configured to acquire temperature (for example, coolant temperature $T_{atf}$ after passing through the cooling device in the embodiment) of the coolant that has passed through the coolant dissipator based on the heat dissipation amount of the coolant acquired by the heat dissipation amount acquisition unit; and a temperature estimation unit (for example, a part temperature calculator 53 in the embodiment) configured to estimate temperature of a predetermined part of the rotating electric machine, which exchanges heat with the coolant by using the temperature of the coolant acquired by the coolant temperature acquisition unit.

(2) The temperature estimation device for a rotating electric machine according to the above (1) may be configured such that the rotating electric machine is mounted on a vehicle, and the physical quantity correlating with the air speed of the cooling air is vehicle speed of the vehicle.

(3) The temperature estimation device for a rotating electric machine according to the above (1) may be configured such that the rotating electric machine is coupled with a drive shaft of a vehicle, and the physical quantity correlating with the air speed of the cooling air is the number of revolution of the rotating electric machine or the drive shaft.

(4) The temperature estimation device for a rotating electric machine according to any one of the above (1) to (3) may be configured such that the physical quantity correlating with the flow rate of the coolant is the number of revolution of a pump (for example, a mechanical pump 14c in the embodiment) that causes the coolant to circulate in a circulation path (for example, coolant flow passage 14a in the embodiment) including the coolant dissipator and the rotating electric machine.

(5) The temperature estimation device for a rotating electric machine according to any one of the above (1) to (3) may be configured such that the physical quantity correlating with the flow rate of the coolant is the number of revolution of a shaft (for example, a rotating shaft of the power generation motor 12 in the embodiment) drivingly coupled with a pump (for example, a mechanical pump 14c in the embodiment) that causes the coolant to circulate in a circulation path (for example, coolant flow passage 14a in the embodiment) including the coolant dissipator and the rotating electric machine.

(6) The temperature estimation device for a rotating electric machine according to any one of the above (1) to (5) may be configured such that the temperature estimation unit estimates temperature of a predetermined part of the rotating electric machine contacting the coolant, based on the temperature of the coolant acquired by the coolant temperature acquisition unit.

(7) The temperature estimation device for a rotating electric machine according to any one of the above (1) to (6) may further include a coolant temperature detector (for example, a coolant temperature sensor 47 in the embodiment) configured to detect temperature of the coolant before the coolant dissipator in a flow direction of the coolant, in which the coolant temperature acquisition unit acquires temperature of the coolant that has passed through the coolant dissipator, based on the temperature of the coolant detected by the coolant temperature detector and the heat dissipation amount of the coolant acquired by the heat dissipation amount acquisition unit.

The temperature estimation device of the rotating electric machine according to the above (1) estimates temperature of a predetermined part of the rotating electric machine that exchanges heat with the coolant by using temperature of the coolant that has passed through the cooling device. Thus, accuracy of temperature estimation may be improved compared with a case using temperature of the coolant at the other position. For example, like detected temperature of the coolant stored at the bottom of a housing accommodating the rotating electric machine, temperature of the coolant exchanging heat with a predetermined part of the rotating electric machine may be acquired accurately compared with a case using temperature of the coolant detected before passing through the coolant dissipator. Thus, temperature of a predetermined part of the rotating electric machine exchanging heat with the coolant may be estimated accurately. Since heat dissipation amount of the coolant may be acquired accurately based on a physical quantity correlating with air speed of the cooling air that cools down the coolant in the coolant dissipator and a physical quantity correlating with flow rate of the coolant, accuracy of the temperature of the coolant that has passed through the coolant dissipator may be improved.

Further, in case of the above (2), the physical quantity correlating with air speed of the cooling air may be acquired in a convenient and accurate manner by using vehicle speed detected by a vehicle speed sensor of a vehicle on which the rotating electric machine is mounted. Thus, complication of the device configuration may be suppressed, and heat dissipation amount of the coolant may be acquired accurately as well.

Further, in case of the above (3), the physical quantity correlating with the air speed of the cooling air may be acquired in a convenient and accurate manner by using the number of revolution of the rotating electric machine coupled with a drive shaft of the vehicle or the number of revolution of the drive shaft. Thus, complication of the device configuration may be suppressed, and heat dissipation amount of the coolant may be acquired accurately as well.

Further, in case of the above (4), complication of device configuration may be suppressed, and heat dissipation amount of the coolant may be acquired accurately by using the number of revolution of the pump that causes the coolant to circulate in the circulation path.

Further, in case of the above (5), complication of the device configuration may be suppressed, and heat dissipation amount of the coolant may be acquired accurately by using the number of revolution of a shaft such as a drive shaft of the rotating electric machine drivingly coupled with the pump that causes the coolant to circulate in the circulation path.

Further, in case of the above (6), temperature estimation accuracy of a predetermined part of the rotating electric machine may be improved by using the temperature of the coolant that has passed through the coolant dissipator, in consideration of heat dissipation amount of the coolant in the coolant dissipator, the temperature having not so much difference from temperature of the coolant actually exchanging heat with a predetermined part of the rotating electric machine.

Further, in case of the above (7), complication of the device configuration may be prevented, for example, by using a temperature detector pre-disposed before the coolant dissipator within the device, such as a temperature sensor configured to detect temperature of the coolant stored at the bottom of a housing accommodating the rotating electric machine. By considering an effect of heat dissipation amount of the coolant in the coolant dissipator on the temperature of the coolant before the coolant dissipator, temperature of the coolant that has passed through the coolant dissipator may be acquired accurately, and temperature of a predetermined part of the rotating electric machine cooled down by the coolant that has passed through the coolant dissipator may be estimated accurately. Also, compared with a case where a temperature sensor for detecting the temperature of the coolant which has passed through the coolant dissipator is newly disposed downstream of the coolant dissipator, increase of the pressure loss of the coolant may be prevented and thereby increase of energy consumption for circulating the coolant may be suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A temperature estimation apparatus for a rotating electric machine, comprising:
    a coolant dissipator configured to cool down a coolant by heat exchange with a cooling air outside a rotating electric machine, the coolant cooling down the rotating electric machine;
    a heat dissipation amount acquisition unit configured to acquire heat dissipation amount of the coolant in the coolant dissipator based on a physical quantity correlating with air speed of the cooling air and a physical quantity correlating with flow rate of the coolant;
    a coolant temperature acquisition unit configured to acquire temperature of the coolant that has passed through the coolant dissipator, based on the heat dissipation amount of the coolant acquired by the heat dissipation amount acquisition unit; and
    a temperature estimation unit configured to estimate temperature of a predetermined part of the rotating electric machine, which exchanges heat with the coolant, by using the temperature of the coolant acquired by the coolant temperature acquisition unit.

2. The temperature estimation apparatus for a rotating electric machine according to claim 1, wherein
    the rotating electric machine is mounted on a vehicle, and
    the physical quantity correlating with the air speed of the cooling air is vehicle speed of the vehicle.

3. The temperature estimation apparatus for a rotating electric machine according to claim 1, wherein
    the rotating electric machine is coupled with a drive shaft of a vehicle, and
    the physical quantity correlating with the air speed of the cooling air is a speed of revolution of the rotating electric machine or the drive shaft.

4. The temperature estimation apparatus for a rotating electric machine according to claim 1, wherein
    the physical quantity correlating with the flow rate of the coolant is a speed of revolution of a pump configured to cause the coolant to circulate in a circulation path including the coolant dissipator and the rotating electric machine.

5. The temperature estimation apparatus for a rotating electric machine according to claim 1, wherein
    the physical quantity correlating with the flow rate of the coolant is a speed of revolution of a shaft drivingly coupled with a pump configured to cause the coolant to circulate in a circulation path including the coolant dissipator and the rotating electric machine.

6. The temperature estimation apparatus for a rotating electric machine according to claim 1, wherein the temperature estimation unit estimates temperature of a predetermined part of the rotating electric machine contacting the coolant, based on the temperature of the coolant acquired by the coolant temperature acquisition unit.

7. The temperature estimation apparatus for a rotating electric machine according to claim 1, further comprising:
    a coolant temperature detector configured to detect temperature of the coolant before the coolant dissipator in a flow direction of the coolant, wherein
    the coolant temperature acquisition unit acquires the temperature of the coolant that has passed through the coolant dissipator, based on the temperature of the coolant detected by the coolant temperature detector and the heat dissipation amount of the coolant acquired by the heat dissipation amount acquisition unit.

8. A temperature estimation apparatus for a rotating electric machine, comprising:
    a coolant dissipator to cool down a coolant by heat exchange with a cooling air outside a rotating electric machine;
    a heat dissipation amount calculator to calculate heat dissipation amount of the coolant in the coolant dissipator based on a physical quantity correlating with air speed of the cooling air and a physical quantity correlating with flow rate of the coolant;
    a coolant temperature calculator to calculate, based on the heat dissipation amount, temperature of the coolant that has passed through the coolant dissipator; and
    a temperature calculator to calculate, based on the temperature of the coolant, temperature of the rotating electric machine which the coolant cools down.

9. The temperature estimation apparatus according to claim 8,
    wherein the rotating electric machine is mounted on a vehicle, and
    wherein the physical quantity correlating with the air speed of the cooling air comprises vehicle speed of the vehicle.

10. The temperature estimation apparatus according to claim 8,
    wherein the rotating electric machine is coupled with a drive shaft of a vehicle, and
    wherein the physical quantity correlating with the air speed of the cooling air comprises a speed of revolution of the rotating electric machine or the drive shaft.

11. The temperature estimation apparatus according to claim 8, wherein the physical quantity correlating with the flow rate of the coolant comprises a speed of revolution of a pump to circulate the coolant in a circulation path including the coolant dissipator and the rotating electric machine.

12. The temperature estimation apparatus according to claim 8, wherein the physical quantity correlating with the flow rate of the coolant comprises a speed of revolution of a shaft drivingly coupled with a pump to circulate the coolant in a circulation path including the coolant dissipator and the rotating electric machine.

13. The temperature estimation apparatus according to claim 8, wherein the temperature calculator calculates temperature of a predetermined part of the rotating electric machine contacting the coolant, based on the temperature of the coolant calculated by the coolant temperature calculator.

14. The temperature estimation apparatus according to claim 8, further comprising:
    a coolant temperature detector to detect temperature of the coolant before the coolant dissipator in a flow direction of the coolant, wherein
    the coolant temperature calculator calculates the temperature of the coolant that has passed through the coolant dissipator, based on the temperature of the coolant detected by the coolant temperature detector and the heat dissipation amount of the coolant calculated by the heat dissipation amount calculator.

15. A temperature estimation apparatus for a rotating electric machine, comprising:
- a coolant dissipator to cool down a coolant by heat exchange with a cooling air outside a rotating electric machine;
- heat dissipation amount calculation means for calculating heat dissipation amount of the coolant in the coolant dissipator based on a physical quantity correlating with air speed of the cooling air and a physical quantity correlating with flow rate of the coolant;
- coolant temperature calculation means for calculating, based on the heat dissipation amount, temperature of the coolant that has passed through the coolant dissipator; and
- temperature calculation means for calculating, based on the temperature of the coolant, temperature of the rotating electric machine which the coolant cools down.

* * * * *